US009003823B2

(12) United States Patent
Tanaka et al.

(10) Patent No.: US 9,003,823 B2
(45) Date of Patent: Apr. 14, 2015

(54) COMBINED AIR-CONDITIONING AND HOT-WATER SUPPLY SYSTEM

(75) Inventors: Kosuke Tanaka, Chiyoda-ku (JP);
Junichi Kameyama, Chiyoda-ku (JP);
Hirofumi Koge, Chiyoda-ku (JP);
Hironori Yabuuchi, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 802 days.

(21) Appl. No.: 13/254,076

(22) PCT Filed: Jan. 19, 2010

(86) PCT No.: PCT/JP2010/000252
§ 371 (c)(1),
(2), (4) Date: Aug. 31, 2011

(87) PCT Pub. No.: WO2010/113372
PCT Pub. Date: Oct. 7, 2010

(65) Prior Publication Data
US 2011/0314848 A1 Dec. 29, 2011

(30) Foreign Application Priority Data

Mar. 31, 2009 (JP) .................................. 2009-086579

(51) Int. Cl.
*F25B 7/00* (2006.01)
*F25B 13/00* (2006.01)
(Continued)

(52) U.S. Cl.
CPC ............. *F25B 13/00* (2013.01); *F24D 2200/31* (2013.01); *F25B 2313/0272* (2013.01);
(Continued)

(58) Field of Classification Search
CPC ......... F24F 5/00; F24F 5/0003; F24F 5/0096; F24H 4/00; F24H 4/02; F24H 4/04; F24D 17/02
USPC ............... 62/79, 159, 160, 175, 238.6, 238.7, 62/324.1, 324.6, 335; 237/2 B
See application file for complete search history.

(56) References Cited

U.S. PATENT DOCUMENTS 7,316,267 B2 * 1/2008 Kunimoto et al. ............. 165/240
2006/0185373 A1 * 8/2006 Butler et al. .................... 62/181
2009/0211282 A1 8/2009 Nishimura et al.

FOREIGN PATENT DOCUMENTS

JP 60-248968 A 12/1985
JP 61-101771 A 5/1986
(Continued)

OTHER PUBLICATIONS

Office Action from Japanese Patent Office issued in corresponding Japanese Patent Application No. 2009-086579 dated Sep. 6, 2011, with an English translation thereof.
(Continued)

*Primary Examiner* — Jonathan Bradford
(74) *Attorney, Agent, or Firm* — Buchanan Ingersoll & Rooney PC

(57) ABSTRACT

A configuration provided with a heat source unit A, an indoor unit B, a circuit D for a hot-water supply heat source provided with a refrigerant-refrigerant heat exchanger and throttle for the hot-water supply heat source, and a branch unit C that distributes a refrigerant flowing through the indoor unit and the circuit for hot-water supply heat source and also provided with a refrigerating cycle for air conditioning in which the indoor unit and the circuit for hot-water supply heat source are connected in parallel and connected to the heat source unit by at least two connection pipelines via the branch unit and a refrigerating cycle for hot-water supply in which a compressor for hot-water supply, a heat-medium-refrigerant heat exchanger, throttle for hot-water supply, and the refrigerant-refrigerant heat exchanger are connected in series, in which the refrigerating cycle for air conditioning and the refrigerating cycle for hot-water supply are connected so as to exchange heat between the refrigerant for air conditioning and the refrigerant for hot-water supply in the refrigerant-refrigerant heat exchanger.

17 Claims, 7 Drawing Sheets

(51) Int. Cl.
  *F24H 6/00*   (2006.01)
  *F24D 17/00*  (2006.01)
  *F24D 17/02*  (2006.01)
  *F24D 19/10*  (2006.01)
  *F24F 5/00*   (2006.01)

(52) U.S. Cl.
  CPC ...... *F25B2313/02742* (2013.01); *Y02B 30/123* (2013.01); *Y02B 30/126* (2013.01); *F24H 6/00* (2013.01); *F24D 17/001* (2013.01); *F24D 17/02* (2013.01); *F24D 19/1072* (2013.01); *F24F 2005/0025* (2013.01); *F24F 2005/0028* (2013.01); *F25B 7/00* (2013.01)

(56) References Cited

FOREIGN PATENT DOCUMENTS

| | | |
|---|---|---|
| JP | 1-256762 A | 10/1989 |
| JP | 2553738 B2 | 11/1996 |
| JP | 2554208 B2 | 11/1996 |
| JP | 2004-132647 A | 4/2004 |
| JP | 2004-183913 A | 7/2004 |
| JP | 2004-226018 A | 8/2004 |
| JP | 2005-164202 A | 6/2005 |
| JP | 2006-017376 A | 1/2006 |
| JP | 2007-278582 A | 10/2007 |
| JP | 2008-082653 A | 4/2008 |

OTHER PUBLICATIONS

Office Action (Text Portion of the First Office Action) dated Jan. 21, 2013, issued in corresponding Chinese Patent Application No. 201080014683.6, and an English Translation thereof. (18 pages).

Chinese Office Action dated Sep. 13, 2013, issued by the Chinese Patent Office in corresponding Chinese Patent Application No. 201080014683.6 (5 pgs.).

International Search Report (PCT/ISA/210) issued on Apr. 13, 2010, by Japanese Patent Office as the International Searching Authority for International Application No. PCT/JP2010/000252.

\* cited by examiner

COMBINED AIR-CONDITIONING AND HOT-WATER SUPPLY SYSTEM

TECHNICAL FIELD

The present invention relates to a combined air-conditioning and hot-water supply system in which a heat pump cycle is mounted and air conditioning (cooling or heating) and hot-water supply can be provided at the same time, and particularly to a combined air-conditioning and hot-wafer supply system that realizes energy saving while a demand for high-temperature hot-water supply is satisfied.

BACKGROUND ART

Hitherto, there has been a combined air-conditioning and hot-water supply system that can provide high-temperature hot-water supply and indoor air-conditioning at the same time by utilizing a dual refrigerating cycle. As such a system, there has been proposed "a heat-pump-type hot-water supply device provided with a lower-stage-side refrigerant circuit in which a first refrigerant is made to flow, and in which a first compressor, a refrigerant distributing device, a first heat exchanger, a second heat exchanger, a first throttle device, an outdoor heat exchanger, a four-way valve, and the first compressor are connected in this order, and from the refrigerant distributing device, the four-way valve, the indoor heat exchanger, and a second throttle device are interposed in this order and connected between the second heat exchanger and the first throttle device, with a higher-stage-side refrigerant circuit in which a second refrigerant flows, and in which a second compressor, a condenser, a third throttle device, the first heat exchanger, and the second compressor are connected in this order, and with a hot-water supply path in which water for hot-water supply is made to flow, and in which the second heat exchanger and the condenser are connected in this order" (See Patent Literature 1 and Patent Literature 2, for example).

Also, there has been proposed an air-conditioning and hot-water supply system provided with an air conditioner provided with a refrigerant circuit for air conditioning in which a compressor, an outdoor heat exchanger, an expansion mechanism, and an indoor heat exchanger are connected and a unit-type hot-water supply device provided with a refrigerant circuit for hot-water supply in which the compressor, the first heat exchanger, the expansion mechanism, and a second heat exchanger are connected in series and into which a carbon dioxide refrigerant is filled, in which the first heat exchanger is connected to a hot-water circuit for hot-water supply that generates hot water from water and is configured to be capable of heat exchange between water of the hot-water circuit for hot-water supply and the carbon dioxide refrigerant, while the second heat exchanger has a heat radiating portion connected in parallel with the indoor heat exchanger of the refrigerant circuit for air conditioning and a heat absorbing portion connected to the refrigerant circuit for hot-water supply and is constituted by a cascade heat exchanger that exchanges heat between the refrigerant of the lower-state-side refrigerant circuit and the carbon dioxide refrigerant" (See Patent Literature 3, for example).

CITATION LIST

Patent Literature

Patent Literature 1: Japanese Patent No. 2553738 (FIG. 1)
Patent Literature 2: Japanese Patent No. 2554208 (FIG. 1)
Patent Literature 3: Japanese Patent No. 3925383 (FIG. 1)

SUMMARY OF INVENTION

Technical Problem

The heat-pump-type hot-water supply devices described in Patent Literature 1 and Patent Literature 2 are systems capable of providing air conditioning (cooling or heating) and hot-water supply at the same time by utilizing the dual refrigerating cycle, that is, two refrigerating cycles. However, in this type of systems, since a high-temperature and high-pressure refrigerant discharged from a compressor is used as a heat source for hot-water supply, an extended connection pipeline is needed from an outdoor unit to a hot-water supply unit, and together with extended connection pipelines for the indoor unit, at least three extended connection pipelines in total are needed, which results in a problem of difficulty whilst constructing the system.

Also, since a refrigerant circuit that performs air conditioning in the indoor unit and a refrigerant circuit that performs hot-water supply are handled differently, a hot-water supply function cannot be added as a simple alternative to the indoor unit, causing a problem that the System cannot be easily introduced into an existing air conditioner.

The air-conditioning and hot-water supply system described in Patent Literature 3 is configured to provide air conditioning (cooling or heating) or hot water supply individually by utilizing a dual refrigerating cycle, that is, two refrigerating cycles via a distributor that distributes the refrigerant. However, with this type of system, air-conditioning and hot-water supply cannot be provided at the same time, and if hot-water supply is needed, the air conditioning has to be stopped, which leads to a problem that convenience and comfort are lost.

Also, since it is configured such that cooling and hot-water supply cannot be provided at the same time, exhaust heat from the outdoor unit during cooling of the air conditioner cannot be used as a heat source for hot-water supply, which results in a problem in terms of energy saving.

The present invention was made in order to solve the above problems and an object thereof is to provide a combined air-conditioning and hot-water supply system capable of realizing convenience, comfort and enemy saving by stably providing air conditioning (cooling or heating) and hot-water supply at the same time.

Also, another object of the present invention is to provide a combined air-conditioning and hot-water supply system that can be easily introduced even into an existing air conditioner that is easy to construct.

Solution to Problem

A combined air-conditioning and hot-water supply system according to the present invention is provided with a heat source unit provided with a compressor for air-conditioning, channel switching means, and an outdoor heat exchanger, an indoor unit provided with an indoor heat exchanger and throttle can for air conditioning, a circuit for hot-water supply heat source provided with a refrigerant-refrigerant heat exchanger and throttle means for hot-water supply heat source, and a branch unit that distributes fluid flowing through the indoor unit and the circuit for hot-water supply heat source, and also provided with a refrigerating cycle for air conditioning which is a first refrigerant circuit in which the indoor unit and the circuit for hot-water supply heat source are connected in parallel and connected to the heat source unit by at least two connection pipelines via the branch unit and a refrigerating cycle for hot-water supply which is a second refrigerant circuit in which a compressor for hot-water supply, a heat medium-refrigerant heat exchanger, throttle means for hot-water supply, and the refrigerant-refrigerant heat exchanger are connected in series, in which the refrigerating cycle for aft conditioning, and the refrigerating cycle for hot-water supply are connected so as to exchange heat between the refrigerant for air conditioning and the refrigerant for hot-water supply in the refrigerant-refrigerant heat exchanger.

Advantageous Effects of Invention

According to the combined air-conditioning and hot-water supply system of the present invention, since while air conditioning (cooling or heating) and hot water supply are provided at the same time, of heat having been discharged into the atmosphere is recovered and can be used as a heat source for hot-water supply, drastic energy saving can be realized while convenience and comfort are maintained.

Also, since the heat source unit and the branch unit can be connected by at least two connection pipelines, construction performance is easy, and moreover, a combined air-conditioning and hot-water supply system can be constructed using a connection pipeline of an existing aft conditioner.

DESCRIPTION OF EMBODIMENTS

Embodiments of the present invention will be described below by petering to the attached drawings, Embodiment 1

Figure 1:
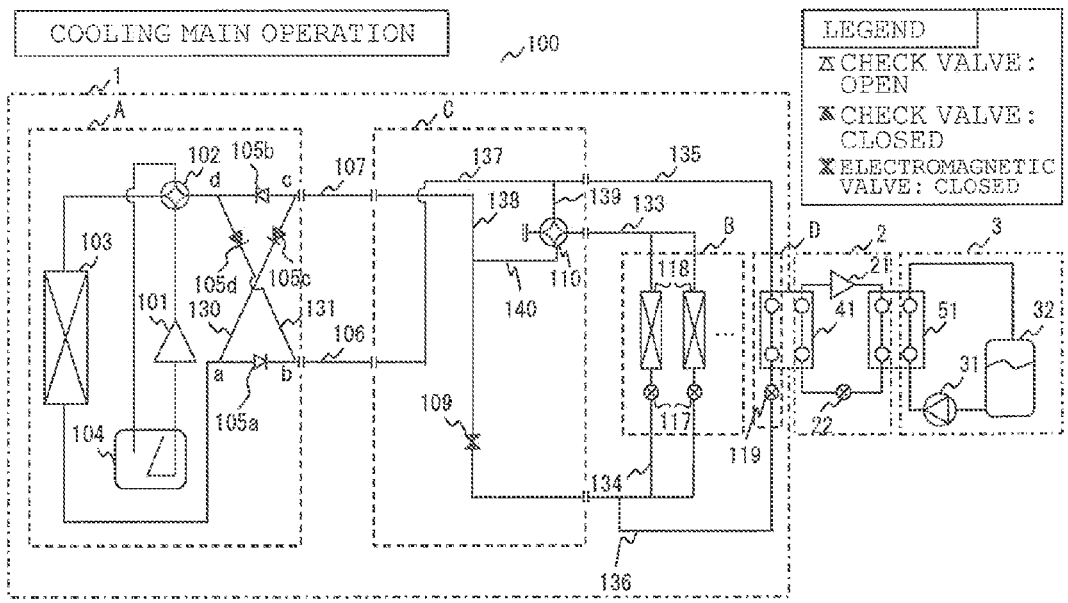
FIG. 1 is a refrigerant circuit diagram during cooling main (cooling+hot-water supply) operation of a combined air-conditioning and hot-water supply system according to Embodiment 1.

FIG. 1 is a refrigerant circuit diagram illustrating a refrigerant circuit configuration (refrigerant circuit configuration during a ceding main (cooling+hot-water supply) operation) of a combined air-conditioning and hot-water supply system 100 according to Embodiment 1 of the present invention. On the basis of FIG. 1, a refrigerant circuit configuration, particularly the refrigerant circuit configuration during the cooling main (cooling+hot-water supply) operation of the combined air-conditioning and hot-water supply system 100, will be described. This combined air-conditioning and hot-water supply system 100 is installed in a budding or an apartment house and the like and can provide air conditioning (cooling or heating) and hot-water supply at the same time by forming a refrigerating cycle (heat-pump cycle) through which a refrigerant for air conditioning is circulated. In the following drawings including FIG. 1, the relationship between sizes of constituent members might be different from the actual ones.

FIG. 1 illustrates a state of a cycle in a refrigerating cycle 1 for air conditioning, in which a load on a cooling indoor unit B is larger than a load on a circuit D for a hot-water supply heat source, and in which an outdoor heat exchanger 103 works as a radiator (condenser) (hereinafter referred to as a cooling-main (cooling+hot-water supply) operation, for convenience). The combined air-conditioning and hot-water supply system 100 in Embodiment 1 is constituted by the refrigerating cycle 1 for air conditioning, a refrigerating cycle 2 for hot-water supply, and a water circulation cycle 3 for hot-water supply connected by connection pipelines such as a high-pressure-side connection pipeline 106 and a low-pressure-side connection pipeline 107 and a branch unit C, and that the refrigerating cycle 1 for air conditioning and the refrigerating cycle 2 for hot-water supply are configured to exchange heat by using a refrigerant-refrigerant heat exchanger 41 and the refrigerating cycle 2 for hot-water supply and the water circulation cycle 3 for hot-water supply by using a heat medium-refrigerant heat exchanger 51, respectively, so that their refrigerants and water do not mix with each other. Each element will be described below in detail.

[Refrigerating Cycle 1 for Air Conditioning]

The refrigerating cycle 1 for air conditioning is composed of a heat source unit A, a cooling indoor unit B handling a cooling load, a circuit D for a hot-water supply heat source that is a heat source for the refrigerating cycle 2 for hot-water supply, and a branch unit C. Among them, the cooling indoor unit B and the circuit D for the hot-water supply heat source are connected and mounted in parallel with the heat source unit A. In addition, the branch unit C installed between the heat source unit A and the cooling indoor unit B as well as the circuit for the hot-water supply heat source enables functions of the cooling indoor unit B and the circuit D for the hot-water supply heat source to be exerted:

[Heat Source Unit A]

The heat source unit A is composed of a compressor 101 for air conditioning, a four-way valve 102, which is a channel switching means, an outdoor heat exchanger 103, and an accumulator 104 connected in series with one another, and this heat source unit A has a function of supplying cold heat to the cooling indoor unit B and the circuit D for the hot-water supply heat source. It is preferable that an air blower such as a fan for supplying air to this outdoor heat exchanger 103 be provided in the vicinity of the outdoor heat exchange 103. Also, in the heat source unit A, a high-pressure-side connection pipeline 106 and a low-pressure-side connection pipeline 107 are connected to a first connection pipeline 131 and a second connection pipeline 130, respectively.

In a cooling main (cooling+hot-water supply) operation, a connection portion between the high-pressure-side connection pipeline 106 and the first connection pipeline 130 (hereinafter referred to simply as a connection portion a) is on the upstream side from a connection portion between the high-pressure-side connection pipeline 106 and the second connection pipeline 131 (hereinafter referred to simply as a connection portion b), and a connection portion between the low-pressure-side connection pipeline 107 and the first connection pipeline 130 (hereinafter referred to simply as a connection portion c) is also on the upstream side from a connection portion between the low-pressure-side connection pipeline 107 and the second connection pipeline 131 (hereinafter referred to simply as a connection portion d).

In the first connection pipeline 130, a check valve 105c that avows communication of a refrigerant for air conditioning only in a direction from the connection portion c to the connection portion a is disposed. In the second connection pipeline 131, too, a check valve 105d that allows communication of a refrigerant for air conditioning only in a direction from the connection portion d to the connection portion b is disposed. Also, a check valve 105a that allows a flow of the refrigerant for air conditioning only in a predetermined direction (the direction from the heat source unit A to the branch unit C) is disposed between the connection portion a of the high-pressure-side connection pipeline 106 and the connection portion b, and a check valve 105b that allows a flow of the refrigerant for air conditioning only in a predetermined direction (the direction from the branch unit C to the heat source unit A) is disposed between the connection portion c of the low-pressure-side connection pipeline 107 and the connection portion d, respectively.

The compressor 101 for air conditioning sucks in the refrigerant for air conditioning, compresses the refrigerant for air conditioning and brings it to a high-temperature and high-pressure state and can be constituted by a type of compressor capable of controlling rotational frequency by using an inverter, for example. The four-way valve 102 switches the flow of the refrigerant for it conditioning. The outdoor heat exchanger 103 functions as an evaporator and a radiator (condenser), exchanges heat between air supped from an air blower, not shown, and the refrigerant for air conditioning and evaporates and gasifies or condenses and liquefies the refrigerant for air conditioning. The accumulator 104 is arranged between the four-way valve 102 and the compressor 101 for air conditioning and stores excess refrigerant for air conditioning during the cooling main (cooling+hot-water supply) operation. It is only necessary that the accumulator 104 is a vessel that can store excess refrigerant for air conditioning,

[Cooling Indoor Unit B]

In the cooling indoor unit B, throttle means 117 for air conditioning and an indoor heat exchanger 118 are connected in series with each other and mounted. In the figure, an example in which two units of the throttle means 117 for are conditioning and two units of the indoor heat exchangers 118 are mounted in parallel with one another, respectively, is shown. The cooling indoor unit B has a function of receiving supply of cold heat from the heat source unit A and handling a cooling load.

That is, in Embodiment 1, a state in which the cooling indoor machine B is determined to handle the cooling load by the branch unit C is shown. It is preferable that an air blower such as a fan for supplying air to this indoor heat exchanger 118 be provided in the vicinity of the indoor heat exchanger 118. Also, for convenience, a connection pipeline connecting the branch unit C to the indoor heat exchanger 118 is referred to as a connection pipeline 133, and a connection pipeline connecting the branch unit C to the throttle means 117 for air conditioning is referred to as a connection pipeline 134 in the following description.

The throttle means 117 for air conditioning functions as a decompression valve or an expansion valve and decompresses and expands the refrigerant for air conditioning. This throttle means 117 for it conditioning can be constituted by throttle means capable of variably controlling an opening degree such as precise flow-rate control means utilising an electronic expansion valve or an inexpensive refrigerant flow-rate regulating means such as a capillary tube and the like, for example. The indoor heat exchanger 118 functions as an evaporator, exchanges heat between the air supplied from air blowing means, not shown, and the refrigerant for air conditioning, and evaporates and gasifies the refrigerant for air conditioning.

[Circuit D for a Hot-Water Supply Heat Source]

The circuit D for the hot-water supply heat source is constituted by throttle means 119 for the hot-water supply heat source and the refrigerant-refrigerant heat exchanger 41 connected in series with each other and has a function of supplying cold heat from the heat source unit A to the refrigerating cycle 2 for hot-water supply via the refrigerant-refrigerant heat exchanger 41. That is, the refrigerating cycle 1 for air conditioning and the refrigerating cycle 2 for hot-water supply are cascade-connected by the refrigerant-refrigerant heat exchanger 41 and constitute a dual refrigerating cycle. For convenience, a connection pipeline connecting the branch unit C to the refrigerant-refrigerant heat exchanger 41 is referred to as a connection pipeline 135, and a connection pipeline connecting the branch unit C to the throttle means 119 for the hot-water supply heat source as a connection pipeline 136 in the following description.

The throttle means 119 for the hot-water supply heat source also functions as a decompression valve or an expansion valve and decompresses and expands the refrigerant for air conditioning similarly to the throttle means 117 for air conditioning. This throttle means 119 for the hot-water supply heat source can be constituted by throttle means capable of variably controlling an opening degree such as precise flow-rate control means utilizing an electronic expansion valve or an inexpensive refrigerant flea, rate regulating means such as a capillary tube and the like, for example. The refrigerant-refrigerant heat exchanger 41 exchanges heat between the refrigerant for hot-water water supply circulating through the refrigerating cycle of the refrigerating cycle 2 for hot-water supply and the refrigerant for air conditioning circulating in the refrigerating cycle of the refrigerating cycle 1 for air conditioning.

[Branch Unit C]

The branch unit C is provided with a connection pipeline 137, a connection pipeline 138, a connection pipeline 139, and a connection pipeline 140 connecting the cooling indoor unit B, the circuit D for the hot-water supply heat source, and the heat source unit A. The connection pipeline 137 connects the high-pressure-side connection pipeline 106 to the connection pipeline 135 connected to the refrigerant-refrigerant heat exchanger 41 of the circuit D for the hot-water supply heat source. The connection pipeline 138 disposed with a valve means 109 that opens/closes a channel, connects the low-pressure-side connection pipeline 107 and the connection pipeline 134 connected to the throttle means 117 for air conditioning of the cooling indoor unit B. The four-way valve 110 is connected to the connection pipeline 133 connected to the indoor heat exchanger 118 of the cooling indoor unit B, and the connection pipeline 139 connects the connection pipeline 137 and the four-way valve 110. The connection pipeline 140 connects the connection pipeline 138 and the four-way valve 110. The four-way valve 110 has a configuration in which one of outlet ports is closed. During the cooling main (cooling+hot-water supply) operation shown in FIG. 1, a channel end portion of the connection pipeline 139 is closed. The valve means 109 can be constituted by valve means capable of variable control of the opening degree such as an electromagnetic valve.

Also, this branch unit C has a function of determining whether the connected indoor heat exchanger 118 should perform cooling (evaporator) or heating (condenser) by opening/closing of the valve means 109 and channel switching of the four-way valve 110. Since the figure shows the state of the cooling operation, the valve means 109 is dosed, and the four-way valve 110 is operating so that the refrigerant flows in the direction indicated by a solid line.

As described above, the refrigerating cycle 1 for air conditioning is formed by constructing a first refrigerant circuit by connecting the compressor 101 for air conditioning, the channel switching means 102, the outdoor heat exchanger 103, the indoor heat exchanger 118, and the throttle means 117 for air conditioning in series and by connecting refrigerant-refrigerant heat exchanger 41 and the throttle means 119 for the hot-water supply heat source in parallel with the indoor heat exchanger 116 and the throttle means 117 for air conditioning, and by circulating the refrigerant for air conditioning through this first refrigerant circuit.

[Cooling Main (Cooling+Hot-Water Supply) Operation]

Figure 2:
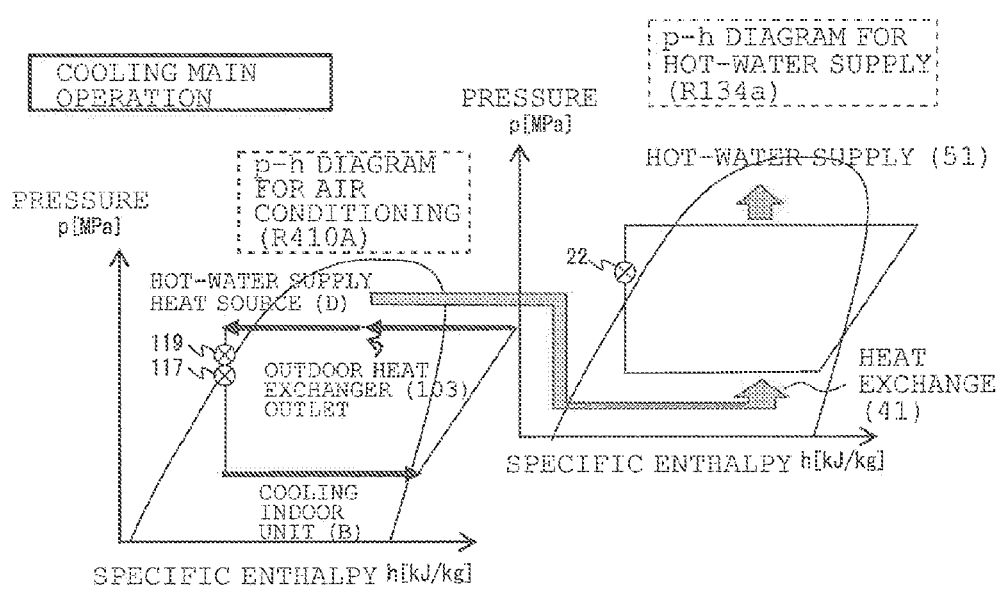
FIG. 2 is a p-h diagram illustrating a refrigerant state during cooling main (cooling+hot-water supply) operation of the combined air-conditioning and hot-water supply system according to Embodiment 1.

Here, an operation of the cooling main (cooling+hot-water supply) operation of the refrigerating cycle 1 for air conditioning will be described. FIG. 2 is a p-h diagram illustrating a refrigerant state of the refrigerating cycle 1 for air conditioning during the cooling main (cooling+hot-water supply) operation. In FIG. 2, the vertical axis indicates absolute pressure p (MPa) and the horizontal axis indicates specific enthalpy h (kJ/kg), respectively. Also, it is shown that the refrigerant for air conditioning is in a gas-liquid two-phase state in a portion surrounded by a saturated liquid line and a saturated steam line, in a liquid state on the left side of the saturated liquid line, and in a gas state on the right side of the saturated steam line, respectively. The example in which R410A is used as the refrigerant for air conditioning in the refrigerating cycle 1 for air conditioning is illustrated. On the basis of FIGS. 1 and 2, an operation of the refrigerating cycle 1 for air conditioning in the combined air-conditioning and hot-water supply system 100 will be described. During the cooling main (cooling+hot-water supply) operation, the channels of the four-way valve 102 and the four-Way valve 110 have been switched to the directions indicated by solid lines in the figure, the check valve 105a and the check valve 105b are open, the check valve 105c and the check valve 105d are closed, and the valve means 109 is closed.

First, the refrigerant for air conditioning having been compressed to a high temperature and a high pressure in the compressor 101 for air conditioning is discharged from the compressor 101 for air conditioning, goes through the four-way valve 102 and then, flows into the outdoor heat exchanger 103. In this outdoor heat exchanger 103, the refrigerant for air conditioning having flowed in exchanges heat with the outdoor air and radiates heat. The refrigerant for air conditioning having flowed out of the outdoor heat exchanger 103 passes through the check valve 105a, is guided to the high-pressure-side connection pipeline 106, and reaches the branch unit C.

Then, the refrigerant for air conditioning having reached the branch unit C passes through the connection pipeline 137 of the branch unit C, but since the channel of the four-way valve 110 has been switched to the direction shown by the solid line in the figure, the refrigerant does not flow to the four-way valve 110 side but passes through the connection pipeline 135 and flows into the circuit. D for the hot-water supply heat source. The refrigerant for air conditioning having flowed into the circuit D for the hot-water supply heat source radiates heat in the refrigerant-refrigerant heat exchanger 41 (that is, gives heat to the refrigerating cycle 2 for hot-water supply), is decompressed by the throttle means 119 for the hot-water supply heat source and flows into the connection pipeline 136.

Subsequently, the refrigerant having passed through the connection pipeline 136 flows into the connection pipeline 134 since the valve means 109 of the branch unit C is closed, and flows into the cooling indoor unit B. The refrigerant for air conditioning having flowed into the cooling indoor unit B is expanded to a low temperature and a low pressure by the throttle means 117 for air conditioning, is evaporated in the indoor heat exchanger 118, passes through the connection pipeline 133 and flows into the branch unit C.

Subsequently, the refrigerant having flowed into the branch unit C passes through the four-way valve 110 and the connection pipeline 140, passes through the connection pipeline 138, flows into the low-pressure-side connection pipeline 107, is guided to the four-way valve 102 via the check valve 105b and returns to the compressor 101 for air conditioning via the accumulator 104.

[Heating Main (Cooling+Hot-Water Supply) Operation]

Subsequently, an operation of the heating main (cooling+hot-water supply) operation of the refrigerating cycle 1 for aft conditioning will be described.

Figure 3:
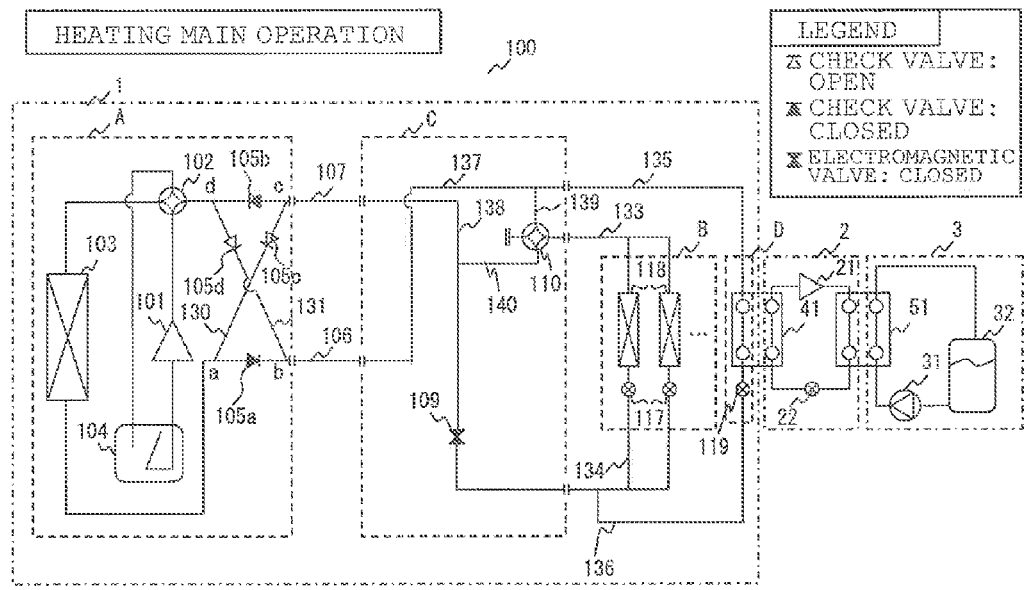
FIG. 3 is a refrigerant circuit diagram during heating main (cooling+hot-water supply) operation of the combined air-conditioning and hot-water supply system according to Embodiment 1.
Figure 4:
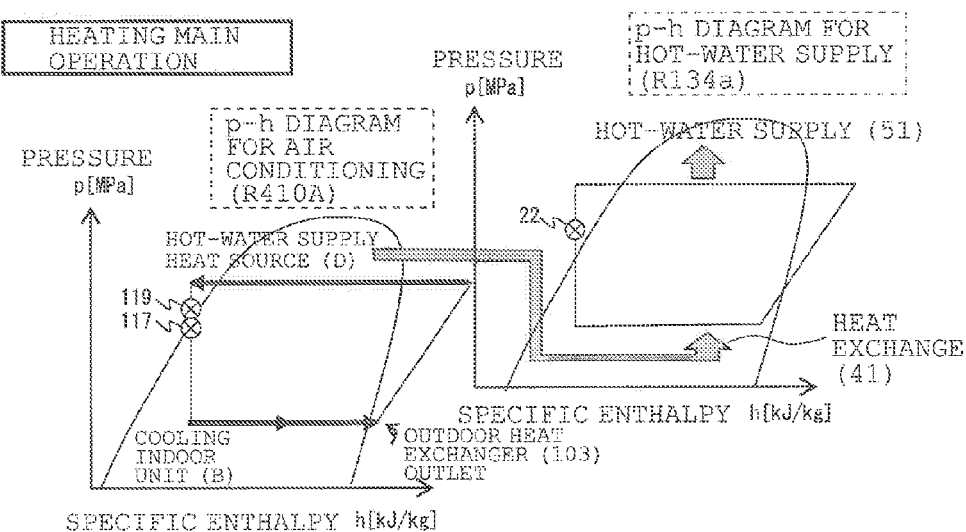
FIG. 4 is a p-h diagram illustrating a refrigerant state during heating main (cooling+hot-water supply) operation of the combined air-conditioning and hot-water supply system according to Embodiment 1.

FIG. 3 is a refrigerant circuit diagram illustrating a refrigerant circuit configuration (a configuration of the refrigerant circuit during the heating main (cooling+hot-water supply) operation) of the combined air-conditioning and hot-water supply system 100 according to Embodiment 1 of the present invention. FIG. 4 is a p-h diagram illustrating a refrigerant state of the refrigerating cycle 1 for air conditioning during the heating main (cooling+hot-water supply) operation. On the basis of FIGS. 3 and 4, the operation of the heating main (cooling+hot-water supply) operation of the refrigerating cycle 1 for air conditioning in the combined air-conditioning and hot-water supply system 100 will be described. During the heating main (cooling+hot-water supply) operation, the channels of the four-way valve 102 and the four-way valve 110 have been switched to the directions indicated by solid lines in the figure, the check valve 105a and the check valve 105b are dosed, the check valve 105c and the check valve 105d are open, and the valve means 109 is dosed.

FIG. 3 illustrates a state of a cycle in the refrigerating cycle 1 for it conditioning, in which a load on a wand indoor unit B is smaller than a load on a circuit D for a hot-water supply heat source, and in which an outdoor heat exchanger 103 works as an evaporator (hereinafter referred to as a heating-main (cooling+hot-water supply) operation, for convenience). In FIG. 4, the vertical axis indicates an absolute pressure p (MPa) and the horizontal axis indicates a specific enthalpy (kJ/kg), respectively. Also, it is shown that the refrigerant for air conditioning is in a gas-liquid two-phase state in a portion surrounded by the saturated liquid line and the saturated steam line, in the liquid state on the left side of the saturated liquid line, and in the gas state on the right side of the saturated steam line, respectively. The example in which R410A is used as the refrigerant for air conditioning in the refrigerating cycle 1 for air conditioning is illustrated.

First, the refrigerant for air conditioning having been compressed to a high temperature and a high pressure in the compressor 101 for air conditioning is discharged from the compressor 101 for air conditioning, goes through the four-way valve 102, is guided to the check valve 105d, passes through the second connection pipeline 131 and is led to the high-pressure-side connection pipeline 106 and reaches the branch unit C in a superheated gas state.

Then, the refrigerant for air conditioning having reached the branch unit C passes through the connection pipeline 137 of the branch unit C, but since the channel of the four-way valve 110 has been switched to the direction shown by the solid line in the figure, the refrigerant does not flow to the four-way valve 110 side but passes through the connection pipeline 135 and flows into the circuit D for the hot-water supply heat source. The refrigerant for air conditioning having flowed into the circuit D for the hot-water supply heat source radiates heat in the refrigerant-refrigerant heat exchanger 41 (that is, gives heat to the refrigerating cycle 2 for hot-water supply), is decompressed by the throttle means 119 for the hot-water supply heat source and flows into the connection pipeline 136.

Subsequently, the refrigerant having passed through the connection pipeline 136 flows into the connection pipeline 134 since the valve means 109 of the branch unit C is closed, and flows into the cooling indoor unit B. The refrigerant for air conditioning having flowed into the cooling indoor unit B is expanded to a low temperature and a low pressure by the throttle means 117 for air conditioning, is evaporated in the indoor heat exchanger 118, passes through the connection pipeline 133 and flows into the branch unit C.

Subsequently, the refrigerant having flowed into the branch unit C passes through the four-way valve 110 and the connection pipeline 140, passes through the connection pipeline 138, flows into the low-pressure-side connection pipeline 107, is guided to the outdoor heat exchanger 103 via the check valve 105c and the first connection pipeline 130 and returns to the compressor 101 for air conditioning via the four-way valve 102 and the accumulator 104.

[Heating Only (Heating+Hot-Water Supply) Operation]

Subsequently, an operation of a heating only (heating+hot-water supply) operation of the refrigerating cycle 1 for air conditioning will be described.

Figure 5:
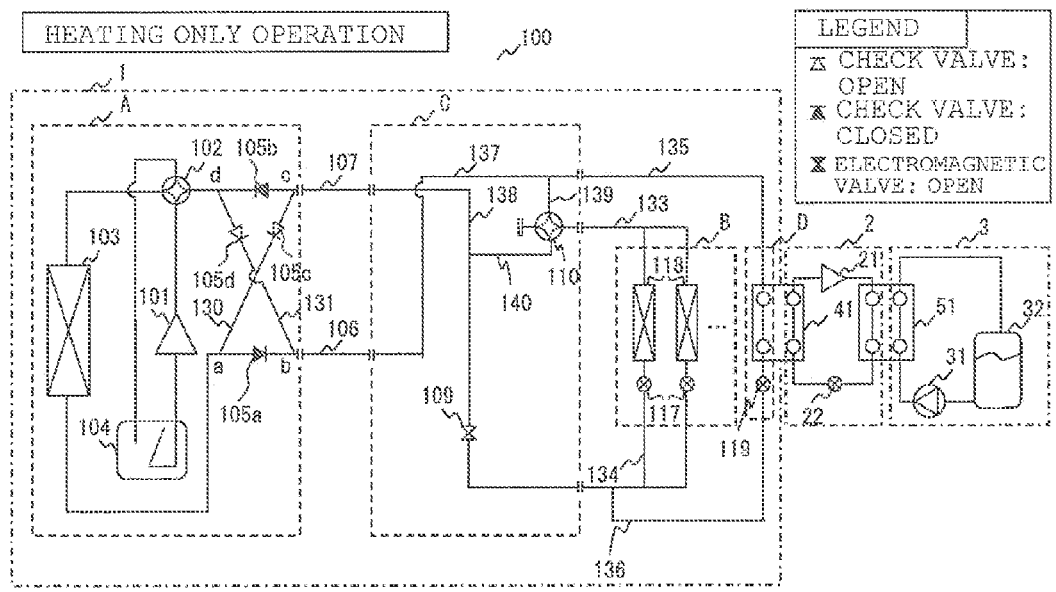
FIG. 5 is a refrigerant circuit diagram during heating only (heating hot-water supply) operation of the combined air-conditioning and hot-water supply system according to Embodiment 1.
Figure 6:
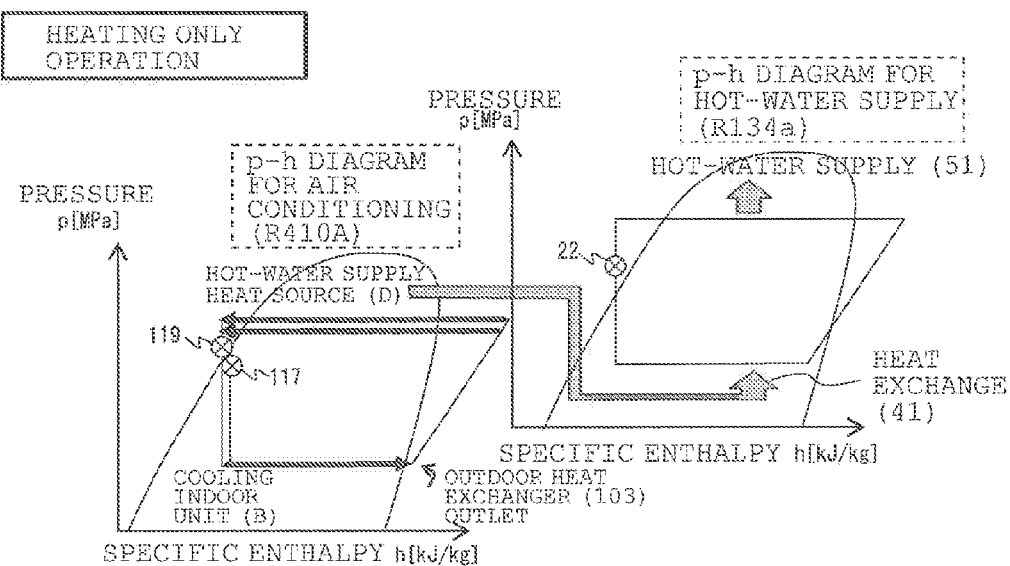
FIG. 6 is a p-h diagram illustrating a refrigerant state during heating only (heating+hot-water supply) operation of the combined air-conditioning and hot-water supply system according, to Embodiment 1.

FIG. 5 is a refrigerant circuit diagram illustrating a refrigerant circuit configuration (a configuration of the refrigerant circuit during the heating only (heating+hot-water supply) operation) of the combined air-conditioning and hot-water supply system 100 according to Embodiment 1 of the present invention. FIG. 6 is a p-h diagram illustrating a refrigerant state of the refrigerating cycle 1 for air conditioning during the heating only (heating+hot-water supply) operation. On the basis of FIGS. 5 and 6, the operation of the heating only (heating+hot-water supply) operation of the refrigerating cycle 1 for air conditioning in the combined air-conditioning and hot-water supply system 100 will be described. During the heating only (heating+hot-water supply) operation, the channels of the four-way valve 102 and the four-way valve 110 have been switched to the directions indicated by solid lines in the figure, the check valve 105a and the check valve 105b are dosed, the check valve 105c and the check valve 105d are open, and the valve means 109 is open.

FIG. 5 illustrates a state of a cycle in the refrigerating cycle 1 for air conditioning, in which the indoor unit B performs a heating operation and a hot-water supply load to the circuit D far the hot-water supply heat source is generated, and in which the outdoor heat exchanger 103 works as an evaporator (hereinafter referred to as a heating only (heating+hot-water supply) operation, for convenience), in FIG. 6, the vertical axis indicates an absolute pressure (MPa) and the horizontal axis indicates a specific enthalpy (kJ/kg), respectively. Also, it is shown that the refrigerant for air conditioning is in a gas-liquid two-phase state in a portion surrounded by a saturated liquid line and a saturated steam line, in a liquid state on the left side of the saturated liquid line, and in a gas state on the right side of the saturated steam line, respectively. An example in which R410A is used as the refrigerant for air conditioning in the refrigerating cycle 1 for air conditioning is illustrated.

First, the refrigerant for air conditioning having been compressed to a high temperature and a high pressure in the compressor 101 for air conditioning is discharged from the compressor 101 for air conditioning, goes through the four-way valve 102, is guided to the check valve 105d, passes through the second connection pipeline 131 and is led to the high-pressure-side connection pipeline 106 and reaches the branch unit C in a superheated gas state.

Then, the refrigerant for air conditioning having reached the branch unit C passes through the connection pipeline 1 of the branch unit C, but since the channel of the four-way valve 110 has been switched to the direction shown by the solid line in the figure, the refrigerant is distributed to the connection pipeline 133 and the connection pipeline 135 and flows into the heating indoor unit B and the circuit D for the hot-water supply heat source. The refrigerant for air conditioning having flowed into the heating indoor unit B is condensed in the indoor heat exchanger 118, expanded to a low temperature and a low pressure in the throttle means 117 for air conditioning and flows into the connection pipeline 134.

On the other hand, the refrigerant for air conditioning having flowed into the circuit D for the hot-water supply heat source radiates heat in the refrigerant-refrigerant heat exchanger 41 (that is, gives heat to the refrigerating cycle 2 for hot-water supply), is decompressed by the throttle means 119 for the hot-water supply heat source and flows into the connection pipeline 136.

Subsequently, the refrigerants having passed through the connection pipeline 134 and the connection pipeline 136 merge together, and since the valve means 109 of the branch unit C is open, the refrigerant flows into the branch unit C.

The refrigerant having flowed into the branch unit C passes through the valve means 109 and the connection pipeline 138, flows into the low-pressure-side connection pipeline 107, is guided to the outdoor heat exchanger 103 via the check valve 105c and the first connection pipeline 130 and returns to the compressor 101 for air conditioning via the four-way valve 102 and the accumulator 104.

[Refrigerating Cycle 2 for Hot-Water Supply]

On the basis of FIGS. 1, 3, and 5, the refrigerating cycle 2 for hot-water supply will be described. The operation of the refrigerating cycle 2 for hot-water supply is not different from the operation state of the refrigerating cycle 1 for air conditioning, that is, whether the cooling main (cooling+hot-wafer supply) operation is being performed, the heating main (cooling+hot-water supply) operation is being performed or the heating only (heating+hot-water supply) operation is being performed. As shown in FIGS. 1, 3, and 5, the refrigerating cycle 2 for hot-water supply is composed of a compressor 21 for hot-water supply, the heat medium-refrigerant heat exchanger 51, throttle means 22 for hot-water supply, and the refrigerant-refrigerant heat exchanger 41. That is, the refrigerating cycle 2 for hot-water supply is formed by constituting a second refrigerant circuit by connecting the compressor 21 for hot-water supply, the heat medium-refrigerant heat exchanger 51, the throttle means 22 for hot-water supply, and the refrigerant-refrigerant heat exchanger 41 in series and by circulating the refrigerant for hot-water Supply through this Second refrigerant circuit.

The compressor 21 for hot-water supply sucks in the refrigerant for hot-water supply, compresses the refrigerant for hot-water supply and brings it to a high-temperature and high-pressure state and Can be constituted by a type capable of controlling a rotational frequency by using an inverter, for example. The heat medium-refrigerant heat exchanger 51 exchanges heat between water (heat medium) circulating through the water circulation cycle 3 for hot-water supply and the refrigerant for hot-water supply circulating through the refrigerating cycle 2 for hot-water supply. The throttle means 22 for hot-water supply functions as a decompression valve or an expansion valve and decompresses and expands the refrigerant for hot-water supply. This throttle means 22 for hot-water supply can be constituted by those capable of variably controlling an opening degree such as precise flow-rate control means utilizing an electronic expansion valve or an inexpensive refrigerant flow-rate regulating means such as a capillary tube and the like, for example. The refrigerant-refrigerant heat exchanger 41 exchanges heat between the refrigerant for hot-water supply circulating through the refrigerating cycle 2 for hot-water supply and the refrigerant for air conditioning circulating through the refrigerating cycle 1 for air conditioning

[Operation of Refrigerating Cycle 2 for Hot-Water Supply]

Here, an operation of the refrigerating cycle 2 for hot-water supply will be described.

FIGS. 2, 4, and 6 show p-h diagrams illustrating the refrigerant state of the refrigerating cycle 2 for hot-water supply during the cooling main (cooling+hot-water supply) operation, during the heating main (cooling hot-water supply) operation and during the heating only (heating+hot-water supply) operation. On the basis of FIGS. 1 to 6, the operation of the refrigerating cycle 2 for hot-water supply in the combined air-conditioning and hot-water supply system 100 will be described. Figures illustrate that the refrigerant for hot-water supply is in the gas-liquid two-phase state in a portico surrounded by the saturated liquid line and the saturated steam line, in the liquid state on the left side of the saturated liquid line, and in the gas state on the right side of the saturated steam line, respectively. The example in which R134a is used as the refrigerant for hot-water supply in the refrigerating cycle 2 for hot-water supply is illustrated.

First, the refrigerant for hot-water supply having been compressed to a high temperature and a high pressure in the compressor 21 for hot-water supply is discharged from the compressor 21 for hot-water supply and flows into the heat medium refrigerant heat exchanger 51. In this heat medium-refrigerant heat exchanger 51, the inflow refrigerant for hot-water supply radiates heat by heating water circulating through the water circulation cycle 3 for hot-water supply. This refrigerant for hot-water supply is expanded by the throttle means 22 for hot-water supply to below an outlet temperature of the refrigerant-refrigerant heat exchanger 41 in the circuit D for the hot-water supply heat source of the refrigerating cycle 1 for air conditioning. The expanded refrigerant for hot-water supply receives heat in the refrigerant-refrigerant heat exchanger 41 from the refrigerant for air conditioning flowing through the circuit D for the hot-water supply heat source and is evaporated and returns to the compressor 21 for hot-water supply,

[Water Circulation Cycle 3 for Hot-Water Supply]

On the basis of FIGS. 1, 3, and 5, the water circulation cycle 3 for hot-water supply will be described. The operation of the water circulation cycle 3 for hot-water supply is not different from the operation state of the refrigerating cycle 1 for air conditioning, that is, whether the cooling main (cooling+hot-water supply) operation is being performed, the heating main (cooling+hot-water supply) operation is being performed or the heating only (heating+hot-water supply) operation is being performed. As shown in FIGS. 1, 3, and 5, the water circulation cycle 3 for hot-water supply is composed of a water circulation pump 31, the heat medium-refrigerant heat exchanger 51 and a hot-water tank 32.

The water circulation pump 31 sucks in water reserved in the hot-water tank 32, pressurizes the water so as to be circulated in the water circulation cycle 3 for hot-water supply and can be constituted by the type controlling its rotational frequency by using an inverter, for example. The heat medium-refrigerant heat exchanger 51 exchanges heat between water (heat medium) circulating through the water circulation cycle 3 for hot-water supply and the refrigerant for hot-water supply circulating through the refrigerating cycle 2 for hot-water supply as described above. The hot-water tank 32 reserves water heated by the heat medium refrigerant heat exchanger 51,

[Operation of Water Circulation Cycle 3 for Hot-Water Supply]

Subsequently, an operation of the water circulation cycle 3 for hot-water supply will be described.

First, unheated water at a relatively low temperature reserved in the hot-water tank 32 is withdrawn from a bottom part of the hot-water tank 32 by the water circulation pump 31, and water head is obtained. The water that has obtained water head flows into the heat medium-refrigerant heat exchanger 51 and receives heat from the refrigerant for hot-water supply circulating through the refrigerating cycle 2 for hot-water supply in this heat medium-refrigerant heat exchanger 51. That is, the water having flowed into the heat medium-refrigerant heat exchanger 51 is upsurged by the refrigerant for hot-water supply circulating through the refrigerating cycle 2 for hot-water supply, and the temperature is raised. Then, the upsurged water (hot water) returns to an upper part of hot-water tank 32 at a relatively high temperature and is reserved in this hot-water tank 32.

In Embodiment 1, as shown in FIGS. 1, 3, and 5, the example in which the water in the hot-water tank 32 is directly heated by the heat medium-refrigerant heat exchanger 51 is described, but this is not limiting, and water flowing through the pump 31 for water circulation and the heat medium-refrigerant heat exchanger 51 may be configured as a closed system independent from the water in the hot-water tank 32 with its pipeline laid through the hot-water tank 32 so as to heat the water in the hot-water tank 32. In this case, a medium in the closed system does not have to be water but may be brine (anti-freezing fluid) or the like.

Also, the check valve 105a, the check valve 105b, the check valve 105c, and the check valve 105d may be constituted by valve means such as an electromagnetic valve so that the refrigerant channel can be switched more reliably. Moreover, for the compressor 101 for air conditioning and the compressor 21 for hot-water supply, any of various types such as a reciprocating type, a rotary type, a scroll type, a screw type and the like may be used, and those with variable rotational frequency are not limiting, and those with fixed rotational frequency may be used.

The example in which R410A is adopted for the refrigerant for air conditioning circulating through the refrigerating cycle 1 for air conditioning and R134a for the refrigerant for hot-water supply circulating through the refrigerating cycle 2 for hot-water supply is described, but the type of the refrigerants is not particularly limited. For example, any of natural refrigerants including carbon dioxide ($CO_2$), hydrocarbon, helium and the like, refrigerant not containing chlorine such as alternative refrigerants including HFC410A, HFC407C, HFC404A and the like and CFC refrigerants such as R22, R134a and the like used in existing products. Also, the refrigerating cycle 1 for air conditioning and the refrigerating cycle 2 for hot-water supply have refrigerant circuit configurations independent from each other, and the refrigerants circulating therein may be of the same type or different types but they are assumed to exchange heat in the refrigerant-refrigerant heat exchanger 41 and the heat medium-refrigerant heat exchanger 51 without mixing with each other.

If a refrigerant having a low critical temperature is used as the refrigerant for hot-water supply, the refrigerant for hot-water supply in a heat radiation process in the heat medium-refrigerant heat exchanger 51 is expected to be brought into a supercritical state during hot-water supply at a high temperature. However, if the refrigerant in the heat radiation process is in the supercritical state in general, fluctuation of COP caused by a change in a radiator pressure or a radiator outlet temperature is large, and more advanced control is required for an operation that obtains high COP. Also, the refrigerant with a low critical temperature has a high saturated pressure with respect to the same temperature in general, and the thickness of the pipeline or the compressor needs to be increased for that portion, which causes a cost increase.

Moreover, considering that the recommended temperature of the water reserved in the hot-water tank 32 in order to suppress breeding of *Legionella* bacterium and the like is 60° C. or more, a target temperature of hot-water supply is preferably 60° C. or more at the lowest. Based on the above, a refrigerant for hot-water supply having a critical temperature at 60° C. or more at the lowest is preferably employed. By employing such a refrigerant as the refrigerant for hot-water supply of the refrigerating cycle 2 for hot-water supply, higher COP is expected to be obtained more stably with a lower cost.

In Embodiment 1, the example of heat exchange in the outdoor heat exchanger 103 between the refrigerant for air conditioning and the air is illustrated, but this is not limiting, and the heat exchange may be configured to be performed with water, a refrigerant, brine and the like. Also, in Embodiment 1, as shown in FIGS. 1, 3, and 5, the example in which two units or more of the indoor heat exchangers 118 are mounted in the indoor unit B is illustrated, but this is not limiting, and the number of the indoor units B may be one.

The cooling indoor unit B does not particularly limit the capacity of the indoor heat exchanger 118, but the capacity of each of the indoor heat exchangers 118 may be different or may be the same. Also, the example in which excess refrigerant is reserved by the accumulator 104 in the refrigerating cycle 1 for air conditioning is illustrated, but this is not limiting, and the accumulator 104 may be omitted, and the excess refrigerant may be reserved in a heat exchanger (the outdoor heat exchanger 103, the indoor heat exchanger 118, the refrigerant-refrigerant heat exchanger 41 and the like) that becomes a heat radiator in the refrigerating cycle 1 for air conditioning.

Also, in Embodiment 1, the operation performed when there is a demand for hot-water supply all the time is illustrated, but if there is no demand for hot-water supply, it is needless to say that a usual cooling or heating operation is possible merely by stopping the compressor 21 for hot-water supply of the refrigerating cycle 2 for hot-water supply.

Also, as the four-way valve 110 of the branch unit C, a valve or the like that switches channels by using a difference in refrigerant pressures by a pilot valve not shown) is considered in general, but since high-pressure and low-pressure refrigerants are supplied all the time to the connection pipeline 137 and the connection pipeline 138, respectively, the channels can be switched easily by closing one of the outlet ports thereof by using the four-way valve 110.

Also, if there is a demand for high-temperature hot-water supply in the air-conditioning cooling operation during summer, for example, the hot-water supply had to be met by using a boiler or the like, but in the combined air-conditioning and hot-water supply system 100 according to Embodiment 1, hot heat that had been discharged into the atmosphere is recovered and reused for hot-water supply, and the system COP is greatly improved, and energy can be saved.

An example of the present invention has been described on the basis of the combined air-conditioning and hot-water supply system 100 according to Embodiment 1, but the refrigerating cycle 1 for air conditioning that exerts the advantages of the present invention that can be introduced into the combined air-conditioning and hot-water supply system 100 is not limited by that, and any configuration that can supply cooling or heating can be employed, and the configuration may be such that is illustrated in the following Embodiment 2.

Embodiment 2

Figure 7:
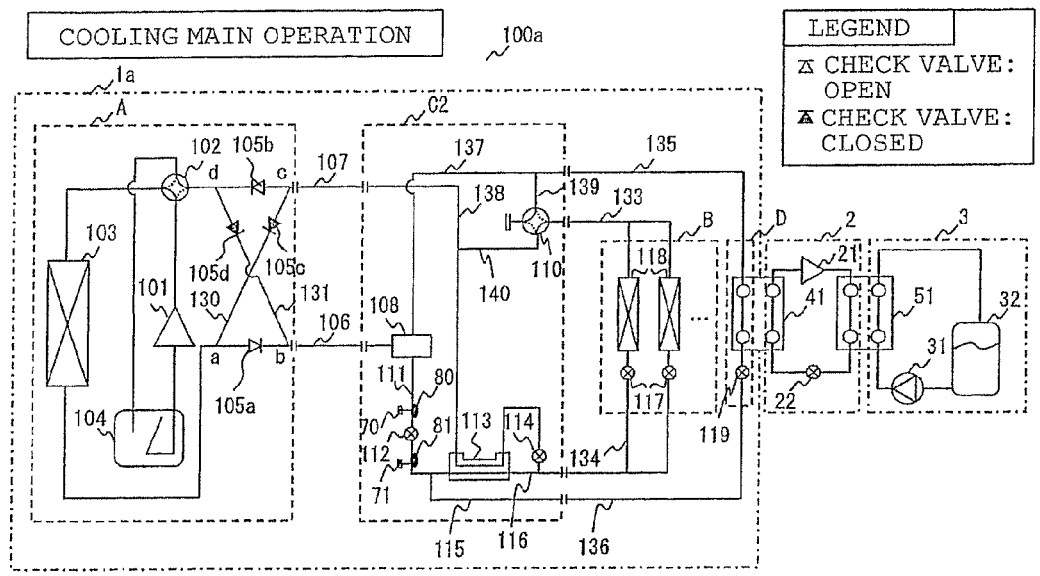
FIG. 7 is a refrigerant circuit diagram during cooling main (cooling+hot-water supply) operation of a combined air-conditioning and hot-water supply system according to Embodiment 2.

FIG. 7 is a refrigerant circuit diagram illustrating a refrigerant circuit configuration (particularly, a refrigerant circuit configuration during a cooling main (cooling+hot-water supply) operation) of a combined air-conditioning and hot-water supply system 100a according to Embodiment 2 of the present invention. On the basis of FIG. 7, a refrigerant circuit configuration of the combined air-condoning and hot-water supply system 100a will be described. This combined air-conditioning and hot-water supply system 100a is installed in a building or an apartment house and the like and can provide air conditioning (cooling or heating) and hot-water supply at the same time by utilizing a refrigerating cycle through which a refrigerant (refrigerant for air conditioning) is circulated, in Embodiment 2, differences from the above-described Embodiment 1 will be mainly described, and the same reference numerals are given to the same portions as those in Embodiment 1 instead of description.

As shown in FIG. 7, in the combined air-conditioning and hot-water supply system 100a according to Embodiment 2, a branch unit C2 of a refrigerating cycle 1a for air conditioning is characterized by being configured differently from the brand) unit C of the refrigerating cycle 1 for air conditioning in the combined air-conditioning and hot-water supply system 100 according to Embodiment 1. The configurations other than the branch unit C2 (that is, the heat source unit A, the cooing indoor unit B, the circuit D for the hot-water supply heat source, the refrigerating cycle 2 for hot-water supply, and the water circulation cycle 3 for hot-water supply) are similar to those in Embodiment 1.

[Branch Unit C2]

This branch unit C2 is composed of a gas-liquid separator 108, an internal heat exchanger 113, a connection pipeline 111 that connects the gas-liquid separator 106 and a high-pressure-side net of the internal heat exchanger 113, first throttle means 112 for branch unit disposed in a channel of the connection pipeline 111, a connection pipeline 115 that connects a channel between the first throttle means 112 for branch unit and the internal heat exchanger 113 and the connection pipeline 136, a connection pipeline 118 that connects a high-pressure-side outlet of the internal heat exchanger 113 and the connection pipeline 134, second throttle means 114 for branch unit disposed in a channel between the channel of the connection pipeline 116 and a low-pressure-side inlet of the internal heat exchanger 113, the four-way valve 110 in which one of the outlet ports is closed, the connection pipeline 138 that connects the low-pressure-side connection pipeline 107 and the low-pressure-side outlet of the internal heat exchanger 113, the connection pipeline 140 that connects the connection pipeline 138 and the connection pipeline 133 via the four-way valve 110, the connection pipeline 137 that connects the gas-liquid separator 108 and the connection pipeline 135, and the connection pipeline 139 that connects the connection pipeline 137 and the four-way valve 110. One end portion of the connection pipeline 139 is closed by channel switching of the four-way valve 110.

If the refrigerant for air conditioning flows in from the high-pressure-side connection pipeline 108 in two phases, the gas-liquid separator 108 separates the two-phase refrigerant into a gas refrigerant and a liquid refrigerant, and the first internal heat exchanger 113 exchanges heat between a guided refrigerant for air conditioning and a refrigerant.

The first throttle means 112 for branch unit and the first throttle means 114 for branch unit decompress and expand the refrigerant for air conditioning. These throttle means can be constituted by those capable of variably controlling an opening degree such as precise flow-rate control means utilizing an electronic expansion valve, an inexpensive refrigerant flowrate regulating means such as a capillary tube and the like, for example.

[Cooling Main (Cooling Hot-Water Supply) Operation]

Here, an operation of the cooling main (cooling+hot-water supply) operation of the refrigerating cycle 1 for air conditioning will be described.

Figure 8:
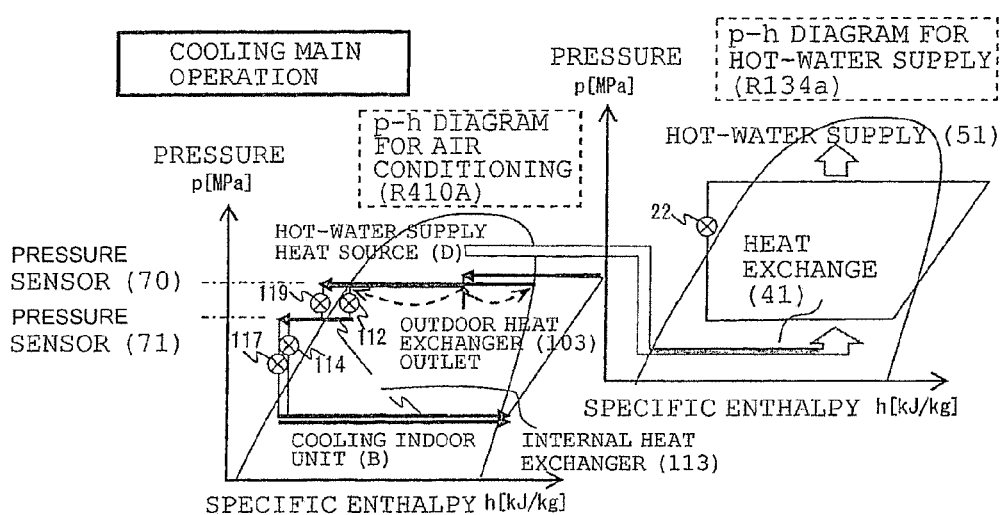
FIG. 8 is a p-h diagram illustrating a refrigerant state during cooling main (cooling+hot-water supply) operation of the combined air-conditioning and hot-water supply system according to Embodiment 2.

FIG. 8 is a p-h diagram illustrating a refrigerant state of the refrigerating cycle 1 for air conditioning during the cooling main (cooling+hot-water supply) operation. In FIG. 8, the vertical axis indicates an absolute pressure p (MPa) and the horizontal axis indicates a specific enthalpy h (kJ/kg), respectively. Also, it is shown that the refrigerant for air conditioning is in a gas-liquid two-phase state in a portion surrounded by a saturated liquid line and a saturated steam line, in a liquid state on the left side of the saturated liquid line, and in a gas state on the right side of the saturated steam line, respectively. The example in which R410A is used as the refrigerant for air conditioning in the refrigerating cycle 1 for air conditioning is illustrated. On the basis of FIGS. 7 and 8, an operation of the refrigerating cycle 1 for air conditioning in the combined air-conditioning and hot-water supply system 100a will be described. During the cooling main (cooling+hot-water supply) operation, the channels of the four-way valve 102 and the four-way valve 110 have been switched to the directions indicated by solid lines in the figure, the check valve 105a and the check valve 105b are open, and the check valve 105c and the check valve 105d are closed.

First, the refrigerant for air conditioning having been compressed to a high temperature and a high pressure in the compressor 101 for air conditioning is discharged from the compressor 101 for air conditioning, goes through the four-way valve 102 and then, flows into the outdoor heat exchanger 103. In this outdoor heat exchanger 103, the refrigerant for air conditioning having flowed in exchanges heat with the outdoor air and radiates heat. The refrigerant for air conditioning baying flowed out of the outdoor heat exchanger 103 passes through the check valve 105a, is guided to the high-pressure-side connection pipeline 106, and reaches the gas-liquid separator 108 of the branch unit C2. If the refrigerant for air conditioning flowing into this gas-liquid separator 108 is in two phases, it is separated into a refrigerant for air conditioning in a gas-phase state and a refrigerant for air conditioning in a liquid-phase state.

Then, the saturated steam (the refrigerant for air conditioning in the gas-phase state) is distributed to the connection pipeline 137. Here, the saturated steam is made to flow into the circuit D for the hot-water supply heat source. The refrigerant for air conditioning having flowed into the circuit D for the hot-water supply heat source radiates heat in the refrigerant-refrigerant heat exchanger 41 (that is, gives heat to the refrigerating cycle 2 for hot-water supply) and is decompressed by the throttle means 119 for the hot-water supply heat source.

On the other hand, the saturated liquid (the refrigerant for air conditioning in the liquid-phase state) separated by the gas-liquid separator 108 is decompressed by the first throttle means 112 for branch unit disposed in the connection pipeline 111 and passes therethrough and the saturated steam (the refrigerant for air conditioning in the gas-phase state) flows into the circuit D for the hot-water supply heat source, radiates heat in the refrigerant-refrigerant heat exchanger 41, is decompressed by the throttle means 110 for the hot-water supply heat source and merges with the refrigerant for air conditioning having passed through the connection pipeline 136 and the connection pipeline 115. Then, the merged refrigerant for air conditioning exchanges heat with the refrigerant for air conditioning expanded by the second throttle means 114 for branch unit to a low temperature and a low pressure in the internal heat exchanger 113 and obtains a supercooling degree. This refrigerant for air-conditioning is distributed in the connection pipeline 116 to the cooling indoor unit B and to the side of the second throttle means 114 for branch unit.

The refrigerant for air conditioning having flowed into the cooling indoor unit B is expanded to a low temperature and a low pressure by the throttle means 117 for air conditioning, evaporated in the indoor heat exchanger 118, passes through the connection pipeline 133, flows into the branch unit C2 and flows into the connection pipeline 138 via the four-way valve 110 and the connection pipeline 140. Also, the refrigerant for air conditioning guided through the second throttle means 114 for branch unit exchanges heat in the internal heat exchanger 113 and is evaporated and merges with the refrigerant for air conditioning having flowed out of the cooling indoor unit B in the connection pipeline 138. Then, the refrigerant for air conditioning merged in the connection pipeline 138 passes through the low-pressure-side connection pipeline 107, is led to the four-way valve 102 via the check valve 105b and returns to the compressor 101 for air conditioning via the accumulator 104.

As described above, by separating the two-phase refrigerant into the gas phase and the liquid phase by the gas-liquid separator 108, a refrigerant with large specific enthalpy, which is the saturated steam, can be supplied to the circuit D for the hot-water supply heat source, and since heat transfer rate when a condensed phase is changed in the refrigerant-refrigerant heat exchanger 41 becomes high, heat exchange efficiency is improved, and energy saving is improved.

If after the saturated liquid of the gas-liquid separator 108 passes through the first throttle means 112 for branch unit, a hot-water supply load is smaller than the cooling load, then by adjusting a bypass amount of the refrigerant for air conditioning by the opening degree of the first throttle means 112 for branch, a heat loss of the refrigerant flowing through the circuit D for the hot-water supply heat source caused by a pressure loss in the refrigerant-refrigerant heat exchanger 41 is reduced, whereby energy saving performances are improved.

As a method of controlling the pressure loss of the refrigerant in the refrigerant-refrigerant heat exchanger 41 to be constant (refrigerant flow rate to be constant) regardless of the refrigerant flow rate fed out of the compressor 101 for air conditioning, it is only necessary that channel resistance through the connection pipeline 111 is controlled by the first throttle means 112 for branch in accordance with the refrigerant flow rate fed out of the compressor 101. Specifically, a high-pressure-side pressure sensor 70 and a low-pressure-side pressure sensor 71 are disposed before and after the first throttle means 112 for branch, and a throttle amount of the first throttle means 112 for branch is controlled so that a difference between the pressures before and after becomes constant.

Also, as an alternative for the pressure sensor, a high-pressure-side temperature sensor 80 may be disposed at a position of the high-pressure-side pressure sensor 70 as shown in FIG. 7 and a low-pressure-side temperature sensor 81 at a position of the low-pressure-side pressure sensor 71, and control may be made so that a temperature difference between them is the same as a difference in saturation temperatures corresponding to the difference in pressures before and after.

In Embodiment 2, the internal heat exchanger 113 is disposed in the branch unit C2 so as to bypass the refrigerant flowing through the connection pipeline 116, and heat exchange is performed with the refrigerant for air conditioning which has been expanded to a low temperature and a low pressure by the second throttle means 114 for branch unit so as to increase the supercooling degree, and by configuring as above, a refrigerating effect of the cooling indoor unit B (a difference in specific enthalpy before and after the indoor heat exchanger 118) is increased, whereby refrigerant flow rates flowing to the connection pipeline 134, the cooling indoor unit B, and the connection pipeline 133 can be decreased, the heat loss by the pressure loss is lowered, and energy saving performances are improved.

Also, since the supercooling degree of the refrigerant for air conditioning flowing through the connection pipeline 134 is increased, even if, due to a configuration of equipment installation, the cooling indoor unit B is installed at a position higher than the branch unit C2 and has a liquid head or if the connection pipeline 134 is long and a pressure loss caused by a friction less occurs, the refrigerant can be made to flow into the throttle means 117 for air conditioning in a state of a liquid refrigerant. Therefore, lowering of cooling capacity or an unstable operation of the equipment with a decrease in the refrigerant flow rate caused by inflow of a flash as into the throttle means 117 for air conditioning can be avoided, and reliability of the equipment is improved.

[Heating Main (Cooling+Hot-Water Supply) Operation]

Subsequently, an operation of the heating main (cooling+hot-water supply) operation of the refrigerating cycle 1 for air conditioning will be described.

Figure 9:
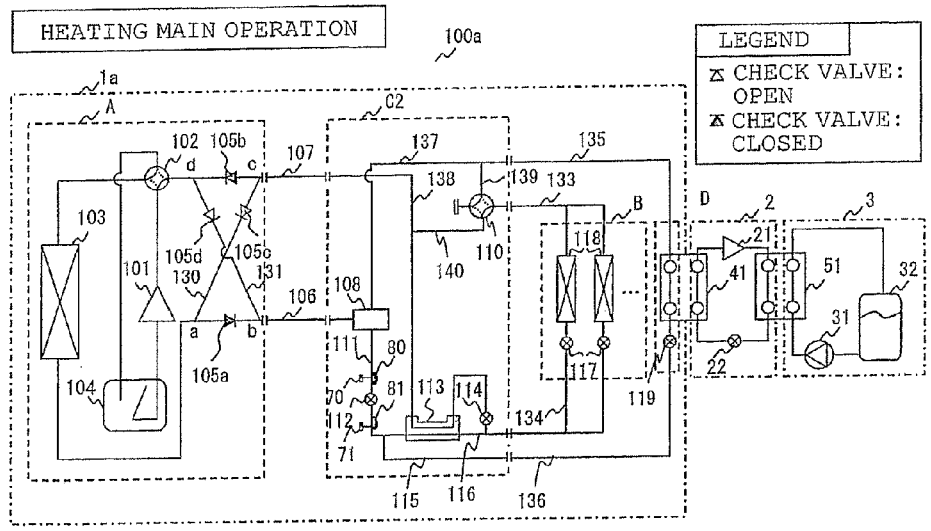
FIG. 9 is a refrigerant circuit diagram during heating main (cooling+hot-water supply) operation of the combined air-conditioning and hot-water supply system according to Embodiment 2.
Figure 10:
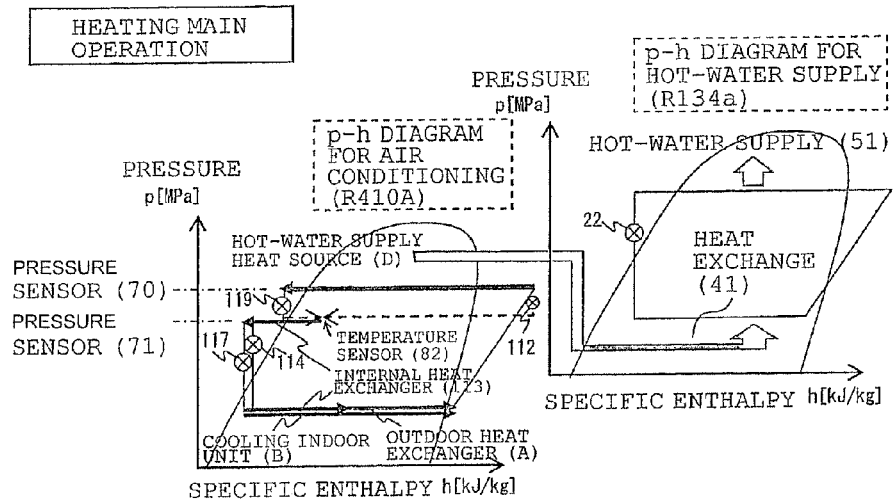
FIG. 10 is a p-h diagram illustrating a refrigerant state during heating main (cooling+hot-water supply) operation of the combined air conditioning and hot-water supply system according to Embodiment 2.

FIG. 9 is a refrigerant circuit diagram illustrating a refrigerant circuit configuration (particularly, a configuration of the refrigerant circuit during the heating main (cooling+hot water supply) operation) of the combined air-conditioning and hot-water supply system 100a according to Embodiment 1 of the present invention. FIG. 10 is a p-h diagram illustrating a refrigerant state of the refrigerating cycle 1 for air conditioning during the heating main (cooling+hot-water supply) operation. On the basis of FIGS. 9 and 10, the operation of the heating main (cooling+hot-water supply) operation of the refrigerating cycle 1 for air conditioning in the combined air-conditioning and hot-water supply system 100a will be described. During the heating main (cooling+hot-water supply) operation, the channels of the four-way valve 102 and the four-way valve 110 have been switched to the directions indicated by solid lines in the figure, the check valve 105a and the check valve 105b are closed, the check valve 105c and the check valve 105d are open, and the first throttle means 112 for branch unit is closed.

FIG. 9 illustrates a state of a cycle in the refrigerating cycle 1 for air conditioning, in which a load on the cooling indoor unit B is smaller than a load on the circuit D for hot-water heat supply source, and in which the outdoor heat exchanger 103 works as an evaporator (hereinafter referred to as a heating main (cooling+hot-water supply) operation, for convenience). In FIG. 10, the vertical axis indicates an absolute pressure (MPa) and the horizontal axis indicates a specific enthalpy (kJ/kg), respectively. Also, it is shown that the refrigerant for air conditioning is in a gas-liquid two-phase state in a portion surrounded by the saturated liquid line and the saturated steam line, in the liquid state on the left side of the saturated liquid line, and in the gas state on the right side of the saturated steam line, respectively. The example in which R410A is used as the refrigerant for air conditioning in the refrigerating cycle 1 for air conditioning is illustrated.

First, the refrigerant for air conditioning having been compressed to a high temperature and a high pressure in the compressor 101 for air conditioning is discharged from the compressor 101 for air conditioning, goes through the four-way valve 102, is guided through the check valve 105d, passes through the second connection pipeline 131 and is led to the high-pressure-side connection pipeline 106 and flows into the gas-liquid separator 108 of the branch unit C2 in a superheated gas state. The refrigerant for air conditioning in the superheated gas state having flowed into the gas-liquid separator 108 flows into the circuit D for hot-water supply heat from the gas-liquid separator 108 via the connection pipeline 137 and the connection pipeline 135 since the first throttle means 112 for branch unit is in the closed state.

The refrigerant for air conditioning having flowed into the circuit D for the hot-water supply heat source radiates heat in the refrigerant-refrigerant heat exchanger 41 (that is, gives heat to the refrigerating cycle 2 for hot-water supply) and is decompressed by the throttle means 119 for the hot-water supply heat source, passes through the connection pipeline 136 and flows into the branch unit C2. The refrigerant having flowed into the branch unit C2 passes through the connection pipeline 115 and flows into the internal heat exchanger 113.

After that, in the internal heat exchanger 113, the overcooling degree is obtained by performing heat exchange with the refrigerant for air conditioning which has been expanded by the second throttle means 114 for branch unit to a low temperature and a low pressure. This refrigerant for air conditioning is distributed to the connection pipeline 134 and the second throttle means 114 for branch unit.

The refrigerant for air conditioning guided through the connection pipeline 134 flows into the cooling indoor unit B. The refrigerant for air conditioning having flowed into the indoor unit B is expanded to a low temperature and a low pressure by the throttle means 117 for air conditioning, is evaporated in the indoor heat exchanger 118, and flows into the branch unit C2 via the connection pipeline 133. The refrigerant having flowed into the branch unit C2 passes through the connection pipeline 140 and the connection pipeline 138 via the four-way valve 110 and flows into the low-pressure-side connection pipeline 107. Also, the refrigerant for air conditioning guided through the second throttle means 114 for branch unit exchanges heat in the internal heat exchanger 113 and is evaporated and merges with the refrigerant for air conditioning having flowed out of the cooling indoor unit B. Then, the refrigerant, for air conditioning flowing through the low-pressure-side connection pipeline 107 passes through the check valve 105c and the first connection pipeline 130 and is led to the outdoor heat exchanger 103 and returns to the compressor 101 for air conditioning via the four-way valve 102 and the accumulator 104.

In Embodiment 2, the internal heat exchanger 113 is disposed in the branch unit C2 so as to bypass the refrigerant flowing through the connection pipeline 116, and heat exchange is performed with the refrigerant for it conditioning which has been expanded to a low temperature and a low pressure by the second throttle means 114 for branch unit so as to increase the supercooling degree, and by configuring as above, a freezing effect of the cooling indoor unit B (a difference in specific enthalpy before and after the indoor heat exchanger 118) is increased, whereby refrigerant flow rates flowing to the connection pipeline 134, the cooling indoor unit B, and the connection pipeline 133 can be decreased, the heat loss by the pressure loss is lowered, and energy saving performances are improved similarly to the cooling main (cooling+hot-water supply) operation.

Also, since the supercooling degree of the refrigerant flowing through the connection pipeline 134 is increased, even if, due to a configuration of equipment installation, the cooling indoor unit B is installed at a position higher than the branch unit C2 and has a liquid head or if the connection pipeline 134 is long and a pressure loss caused by a friction loss occurs, for example, the refrigerant can be made to flow into the throttle means 117 for it conditioning in a state of a liquid refrigerant similarly to the cooling main (cooling+hot-water supply) operation. Therefore, lowering of cooling capacity or an unstable operation of the equipment with a decrease in the refrigerant flow rate caused by inflow of a flash gas into the throttle means 117 for air conditioning can be avoided, and reliability of the equipment is improved.

The second throttle means 114 for branch unit may execute control such that a differential pressure detected by the high-pressure-side pressure sensor 70 and the low-pressure-side pressure sensor 71 disposed before and after the first throttle means 112 for branch unit becomes the same as the differential pressure during the cooling main (cooling+hot-water supply) operation. By controlling as above, even if the flow direction of the refrigerant is switched by the four-way valve 102 in the cooling main (cooling+hot-water supply) operation mode and the heating main (cooling+hot-water supply) operation mode, the pressure and temperature states of the cooling indoor unit B and the circuit D for the hot-water supply heat source remain substantially the same, and the operation state of the combined air-conditioning and hot-water supply system 100a is stabilized, and an operation with high comfort and controllability is realized.

[Heating Only (Heating+Hot-Water Supply) Operation]

Subsequently, an operation of a heating only (heating+hot-water supply) operation of the refrigerating cycle 1 for air conditioning will be described.

Figure 11:
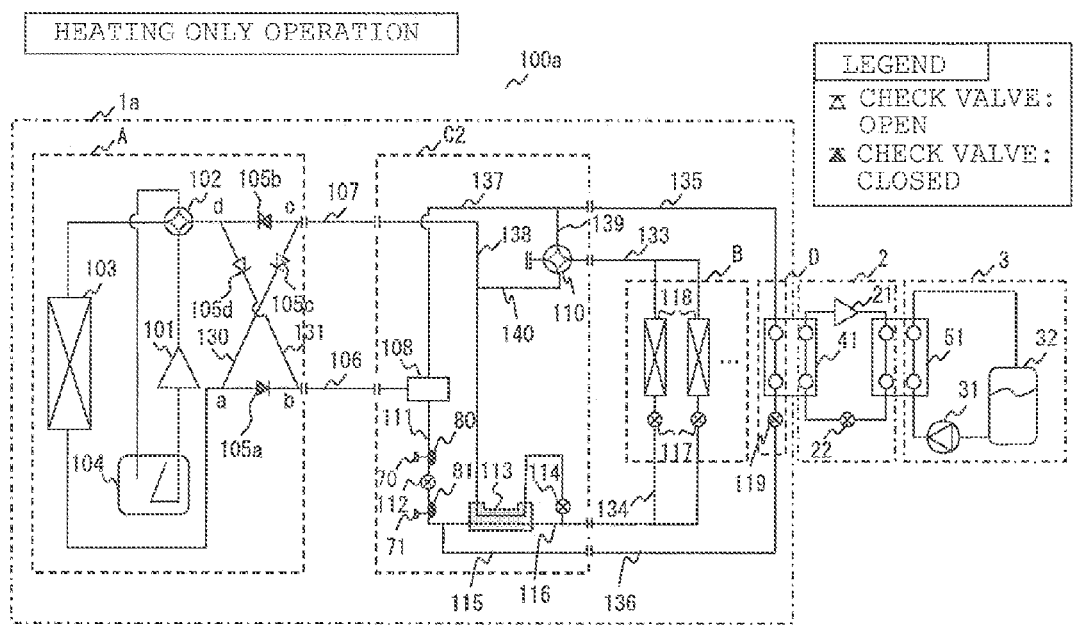
FIG. 11 is a refrigerant circuit diagram during heating only (heating+hot-water supply) operation of the combined air-conditioning and hot-water supply system according to Embodiment 2.
Figure 12:
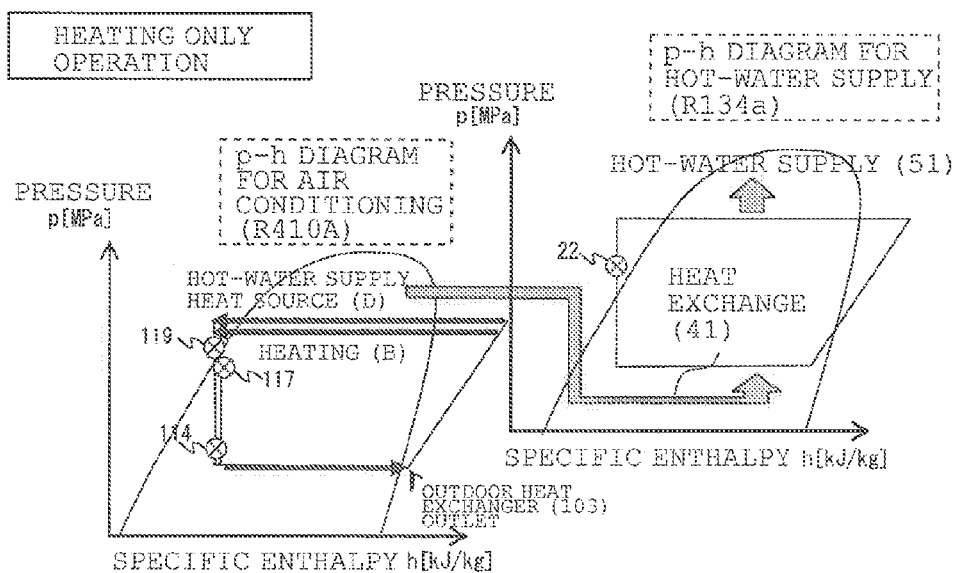
FIG. 12 is a p-h diagram illustrating a refrigerant state during heating only (heating+hot-water supply) operation of the combined air-conditioning and hot-water supply system according to Embodiment 2.

FIG. 11 is a refrigerant circuit diagram illustrating a refrigerant circuit configuration (a configuration of the refrigerant circuit during the heating only (heating+hot-water supply) operation) of the combined air-conditioning and hot-water supply system 100a according to Embodiment 2 of the present invention. FIG. 12 is a p-h diagram illustrating a refrigerant state of the refrigerating cycle 1 for air conditioning during the heating only (heating+hot-water supply) operation. On the basis of FIGS. 11 and 12, the operation of the heating only (heating+hot-water supply) operation of the refrigerating cycle 1 for air conditioning in the combined air-conditioning and hot-water supply system 100a will be described. During the heating only (heating+hot-water supply) operation, the channels of the four-way valve 102 and the four-way valve 110 have been switched to the directions indicated by solid ones in the figure, the check valve 105a and the check valve 105b are closed, the check valve 105c and the check valve 105d are open, and the first throttle means 112 for branch unit is closed:

FIG. 11 illustrates a state of a cycle in the refrigerating cycle 1 for it conditioning, in which the indoor unit B performs a heating operation, a hot-water supply load to the circuit D for the hot-water supply heat source is generated, and the outdoor heat exchanger 103 works as an evaporator (hereinafter referred to as a heating only (heating+hot-water supply) operation for convenience). In FIG. 12, the vertical axis indicates an absolute pressure (MPa) and the horizontal axis indicates a specific enthalpy (kJ/kg) respectively. Also, it is shown that the refrigerant for air conditioning is in a gas-liquid two-phase state in a portion surrounded by a saturated liquid line and a saturated steam line, in a liquid state on the left side of the saturated liquid line, and in a gas state on the right side of the saturated steam line, respectively. An example in which R410A is used as the refrigerant for aft conditioning in the refrigerating cycle 1 for air conditioning is illustrated.

First, the refrigerant for air conditioning having been compressed to a high temperature and a high pressure in the compressor 101 for air conditioning is discharged from the compressor 101 for air conditioning, goes through the four-way valve 102, is guided through the check valve 105c, passes through the second connection pipeline 131 and is led to the high-pressure-side connection pipeline 106 and reaches the branch unit C2 in a superheated gas state.

Then, the refrigerant for air conditioning having reached the branch unit C2 flows into the gas-liquid separator 108. Since the first throttle means 112 for branch unit is in the closed state, the refrigerant for air conditioning in the superheated gas state having flowed into the gas-liquid separator 108 passes through the connection pipeline 137 from the gas-liquid separator 108, but since the channel of the four-way valve 110 has been switched to the direction shown by the sod line in the figure, the refrigerant is distributed to the connection pipeline 133 and the connection pipeline, 135 and flows into the heating indoor unit B and the circuit D for the hot-water supply heat source. The refrigerant for air conditioning having flowed into the heating indoor unit B is condensed in the indoor heat exchanger 118, expanded to a low temperature and a low pressure in the throttle means 117 for air conditioning and flows into the connection pipeline 134.

On the other hand, the refrigerant for air conditioning having flowed into the circuit D for the hot-water supply heat source radiates heat in the refrigerant refrigerant heat exchanger 41 (that is, gives heat to the refrigerating cycle 2 for hot-water supply), is decompressed by the throttle means 119 for the hot-water supply heat source and flows into the connection pipeline 136.

Subsequently, the refrigerants having passed through the connection pipeline 134 and the connection pipeline 136 flow into the branch unit C2 and if the first throttle means 112 for branch unit brings the channel of the connection pipeline 111 in the blocked state, the refrigerants merge together and flow from the connection pipeline 116 into the second throttle means 114 for branch unit.

Subsequently, leaving the second throttle means 114 for branch unit in the full-open state, the refrigerant passes through the connection pipeline 138, flows into the low-pressure-side connection pipeline 107, goes through the check valve 105c and the first connection pipeline 130 and is led to the outdoor heat exchanger 103 and returns to the compressor 101 for air conditioning via the four-way valve 102 and the accumulator 104.

By means of the operation as above, heating and hot-water supply can be provided at the same time similarly to Embodiment 1.

Embodiment 3

Figure 13:
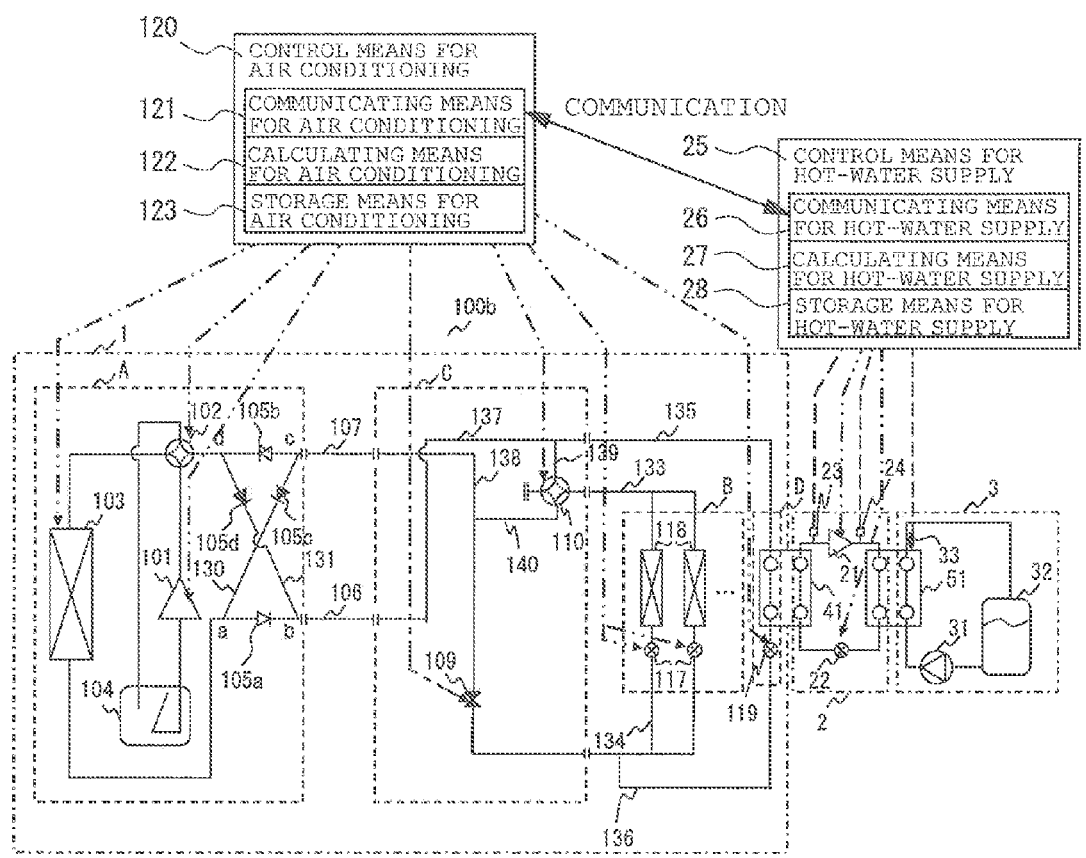
FIG. 13 is a device-linkage configuration diagram of a combined air-conditioning and hot-water supply system according to Embodiment 3.

FIG. 13 is a configuration diagram of a combined air-conditioning and hot-water supply system 100b according to Embodiment 3 of the present invention. In Embodiment 3, differences from the above-described Embodiment 1 will be mainly described, and the same reference numerals are given to the same portions as those in Embodiment 1 instead of description.

In FIG. 13, the state of the four-way valve 102 during the cooling main (Goofing hot-water supply) operation and the heating main (cooling+hot-water supply) operation is shown by a solid line and the state of the four-way valve 102 during the heating only (heating+hot-water supply) operation by a broken line, respectively. As shown in FIG. 13, the combined air-conditioning and hot-water supply system 1001) according to Embodiment 3 is basically the same as the combined air-conditioning and hot-water supply system 100 according to Embodiment 1, but different in a point that hot-water supply low-pressure-side pressure detecting means 3, hot-water supply high-pressure-side pressure detecting means 24, supplied hot-water temperature detecting means (heat medium temperature detecting means) 33, control means 26 for hot-water supply, and control means 120 for air conditioning are provided.

The hot-water supply low-pressure-side pressure detecting means 23 is disposed on the suction side of the compressor 21 for hot-water supply and detects a pressure of the refrigerant for hot-water supply sucked into the compressor 21 for hot-water supply. The hot-water supply high-pressure-side pressure detecting means 24 is disposed on the discharge side of the compressor 21 for hot-water supply and detects a pressure of the refrigerant for hot-water supply discharged from the compressor 21 for hot-water supply. The supplied hot-water temperature detecting means 33 is disposed on the water outlet side of the heat medium-refrigerant heat exchanger 51 and detects the temperature of the water (hot water) reserved in the hot-water tank 32 scheduled to be supplied. Also, detection information by the hot-water supply low-pressure-side pressure detecting means 23, hot-water supply high-pressure-side pressure detecting means 24, and the supplied hot-water temperature detecting means 33 is outputted to the control means 25 for hot-water supply.

The control means 25 for hot-water supply is composed of communicating means 26 for hot-water supply, calculating means 27 for hot-water supply, and storage means 28 for hot-water supply. This control means 25 for hot-water supply stores, in the storage means 28 for hot-water supply, at least one of the ON/OFF state of the refrigerating cycle 2 for hot-water supply, which are the detection information from each of the above detecting means, such as the ON/OFF state of the compressor 21 for hot-water supply, a frequency, a discharge temperature and the like, the high-pressure-side pressure and the low-pressure-side pressure of the refrigerant for hot-water supply circulating through the refrigerating cycle 2 for hot-water supply, a condensation temperature, an evaporation temperature and the like, an inflow hot-water temperature, an outflow hot-water temperature and the like of the heat-medium-refrigerant heat exchanger 51, a degree of throttle of the throttle means 22 for hot-water supply and the throttle means 119 for the hot-water supply heat source (a pulse number when an electronic expansion valve is used) and the like, and then the calculating means 27 for hot-water supply makes calculation based on the stored information, and various controls are executed.

The control means 120 for air conditioning is composed of communicating means 121 for air conditioning, calculating means 122 for air conditioning, and storage means 123 for air conditioning. The control means 120 for air conditioning and the control means 25 for hot-water supply realize a coordinated Control operation by communicating information through the communicating means 26 for hot-water supply provided in the control means 25 for hot-water supply and the communicating means 121 for air conditioning provided in the control means 120 for air conditioning. By making the two control means communicable as above, a more advanced energy-saving system with improved stability can be constructed.

The control means 120 for air conditioning stores at least one or more of the ON/OFF state of the refrigerating cycle 1 for air conditioning, such as the ON/OFF state of the compressor 101 for air conditioning, a frequency, a discharge temperature and the like of the compressor 101 for air conditioning, the high-pressure-side pressure and the low-pressure-side pressure of the refrigerant for air conditioning circulating through the refrigerating cycle 1 for air conditioning, a condensation temperature, an evaporation temperature and the like, a fan air amount, an net temperature, an outlet temperature, a sucked air temperature and the like of the outdoor heat exchanger 103, a switched state of the four-way valve 102, the switched states of the four-way valve 110 and the valve means 109 of the branch unit C, a fan air amount of the cooling indoor unit B, a sucked air temperature of the indoor unit and the like, which are the detection information from the various detecting means, not shown, in the storage means 123 for air conditioning, and then the calculating means 122 for air conditioning makes calculation based on the stored information, and various controls are executed.

A specific mode of the control executed in this Embodiment will be described below.

For example, by communicating the ON/OFF state of the compressor 101 for air conditioning from the control means 120 for air conditioning to the control means 25 for hot-water supply and by controlling the ON/OFF timing of the compressor 21 for hot-water supply in accordance with that, the compressor 21 for hot-water supply does not have to perform a wasteful operation, and energy can be saved for that portion. After the compressor 101 for air conditioning is started, by starting the compressor 21 for hot-water supply after the refrigerating cycle 1 for air conditioning is stabilized, the refrigerant for hot-water supply of the refrigerating cycle 2 for hot-water supply can sufficiently absorb heat of the refrigerating cycle 1 for air conditioning and perform evaporation while the refrigerant for hot-water supply of the refrigerating cycle 2 for hot-water supply passes through the refrigerant-refrigerant heat exchanger 41, and thus, the refrigerating cycle 2 for hot-water supply can stably operate, reliability of the system is improved, and energy can be saved reliably.

Also, when the compressor 101 for air conditioning is stopped once due to a failure or an under-load and operated again and if the compressor 21 for hot-water supply is operating at a high frequency, if the compressor 21 for hot-water supply is not controlled in conjunction with the compressor 101 for air conditioning and is operated at a high frequency, it is expected that, a low-pressure-side pressure of the refrigerating cycle 2 for hot-water supply will fall abnormally while the compressor 101 for air conditioning is stopped and that a large heat shock will occur when the compressor 101 for air conditioning is operated again. Thus, if the compressor 101 for air conditioning is stopped while the compressor 21 for hot-water supply is operating, by adding a target of containing the low-pressure-side pressure of the refrigerating cycle 2 for hot-water supply within a predetermined range to control targets of the compressor 21 for hot-water supply, for example, a large heat shock is prevented, reliability of the system is improved for a longer time, and energy can be saved reliably.

In the combined air-conditioning and hot-water supply system 100b according to Embodiment 3, in a situation in which the water in the hot-water tank 32 is at a low temperature, a compression ratio of the compressor 21 for hot-water supply can be easily made small and stall or the like of the compressor for hot-water supply can occur. Thus, of the basis of the outputs of the hot-water supply low-pressure-side pressure detecting means 23 and the hot-water supply high-pressure-side pressure detecting means 24 of the refrigerating cycle 2 for hot-water supply stored by the control means 25 for hot-water supply, if the compression ratio of the compressor 21 for hot-water supply calculated by the calculating means 27 for hot-water supply fails under the predetermined range, the refrigerating cycle 2 for hot-water supply is controlled in a direction to increase the compression ratio by throttling the throttle means 22 for hot-water supply, reliability of the system is improved, and energy can be saved reliably.

Specifically, the control means 25 for hot-water supply and the throttle means 22 for hot-water supply are connected through wires or wirelessly so as to directly give a signal (if an electronic expansion valve is used, for example, a signal to decrease the pulse is sent), or the throttle means 22 for hot-water supply may be throttled indirectly by increasing a supercooling degree of the refrigerant for hot-water supply at the outlet of the heat medium-refrigerant heat exchanger 51 or a superheating degree of the refrigerant for hot-water supply at the outlet of the refrigerant-refrigerant heat exchanger 41, the degrees expected as control target values of the throttle means 22 for hot-water supply, to a value larger than the value when the compression ratio of the refrigerating cycle 2 for hot-water supply is within a predetermined range.

Also, by giving a control signal to throttle the throttle means 119 for the hot-water supply heat source, the evaporation heat source of the refrigerating cycle 2 for hot-water supply is decreased, and thus the low-pressure-side pressure of the refrigerating cycle 2 for hot-water supply is decreased, whereby the compression ratio of the refrigerating cycle 2 for hot-water supply can be also increased. Specifically the control means 25 for hot-water supply and the throttle means 119 for the hot-water supply heat source are connected through wires or wirelessly so as to directly give a signal of throttling (if an electronic expansion valve is used, for example, a signal to decrease the pulse is sent), or the throttle means 119 for the hot-water supply may be throttled indirectly by increasing a supercooling degree of the refrigerant for air conditioning at the outlet of the refrigerant-refrigerant heat exchanger 41, the degree expected as a control target value of the throttle means 119 for the hot-water supply heat source, to a value larger than the value when the compression ratio of the refrigerating cycle 2 for hot-water supply is within a predetermined range.

Here, the example in which the throttle means 119 for the hot-water supply heat source is controlled by connecting to the control means 25 for hot-water supply through wires or wirelessly is shown, but this is not limiting, and the control may be made by connecting to the control means 120 for air conditioning. Also, the hot-water supply low-pressure-side pressure detecting means 23 may be replaced by temperature detecting means attached to the pipeline between the throttle means 22 for hot-water supply and the refrigerant-refrigerant heat exchanger 41, for example, that detects an evaporation temperature, from the output of which a saturated pressure is calculated. Moreover, though it is difficult if the heat medium-refrigerant heat exchanger 51 is a plate-type heat exchanger, if a condensation temperature can be detected by temperature detecting means as in the case when the refrigerant is made to flow to the outside by a double-pipe type heat exchanger, for example, the hot-water supply high-pressure-side pressure detecting means 24 may be also replaced by temperature detecting means that detects a condensation temperature, from the output of which a saturated pressure is calculated.

Also, regarding the control of the compressor 21 for hot-water supply, by executing control by setting the output of the supplied hot-water temperature detecting means 33 as a target value, in which a user's demand is directly met, and wasteful operation is eliminated, and energy can be saved. However, the pipeline on the water side of the heat medium-refrigerant heat exchanger 51 is expected to employ stainless from the viewpoint of corrosion resistance, and in this case, in order to detect a supplied hot-water temperature, a method of attaching the temperature detecting means on the outside of the pipeline of a hot water supply portion cannot be adopted, a water temperature inside the pipeline needs to be directly detected, which raises cost and becomes an obstacle in introducing the energy-saving system.

However, if the performances of the heat medium-refrigerant heat exchanger 51 are known in advance, it is known that the supplied hot-water temperature can be estimated with certain accuracy from a condensation temperature of the refrigerant for hot-water supply subjected to exchange heat with water. For example, in a certain combination, a simulation has confirmed that a difference between the supplied hot-water temperature and the condensation temperature of the refrigerating cycle 2 for hot-water supply is 6° C., and even if the water circulation amount is decreased to ¼ times, the value will be reduced only by 3° C. Therefore, without directly measuring the supplied hot water temperature, the supplied hot-water temperature can be estimated with certain accuracy on the basis of the output of the hot-water supply high-pressure-side pressure detecting means 24 of the refrigerating cycle 2 for hot-water supply and the estimated value can be set as a control target value of the compressor 21 for hot-water supply.

That is, the control means 25 for hot-water supply can estimate a temperature (supplied hot-water temperature) of a heat medium (water, here) on the outlet side of the heat medium-refrigerant heat exchanger 51 on the basis of at least one or more values including a pressure on the high-pressure-side of the refrigerating cycle 2 for hot-water supply, a condensation temperature, and a temperature at a position from the outlet of the compressor 21 for hot-water supply to the inlet of the heat medium-refrigerant heat exchanger 51, and control the compressor 21 for hot-water supply so that this estimate value becomes close to a predetermined target value, and thus the enemy-saving system can be introduced without rising cost.

Also, in a situation in which the water in the hot-water tank 32 is at a low temperature, a heat exchange amount in the heat medium-refrigerant heat exchanger 51 tends to increase, and if the heating indoor unit B is operating at the Same time, for example, a required heating capacity might not be able to be obtained on the heating indoor unit B side.

In the system relating to this embodiment, if the water in the hot-water tank 32 is at a low temperature, for example, the heating capacity of the heating indoor unit B can be ensured by executing control such that an upper limit value of the frequency of the compressor 21 for hot-water supply is made small, and a stable energy-saving system can be realized without damaging comfort for a user.

Also, in this embodiment, while no heating indoor unit B is operating, there is no need to worry capacity lack of the heating indoor unit B, and control such that the upper limit value of the frequency of the compressor 21 for hot-water supply is not decreased can be employed, and the capacity of the system can be utilized to the maximum. The temperature of the water in the hot-water tank 32 may be estimated by using the inflow water temperature or the outflow water temperature.

Also, the system relating to this embodiment is a system for which energy saving is realized by decreasing exhaust heat by bearing a cooling load and a hot-water supply load at the same time, but though the cooling load depends on a real-time demand by a user, the hot-water load can be borne by hot heat reserved in the hot-water tank 32, and in the system in which the refrigerating cycle for air conditioning communicates with the refrigerating cycle for hot-water supply as in this embodiment, by operating the refrigerating cycle 2 for hot-water supply in accordance with the operation of the cooling indoor unit B, for example, an operation so as to minimize the exhaust heat can be performed.

Also, by means of communication between the refrigerating cycle for air conditioning and the refrigerating cycle for hot-water supply in minimizing the exhaust heat, by controlling the compressor 21 for hot-water supply so as to reduce the heat exchange amount in the outdoor heat exchanger 103 of the refrigerating cycle for air conditioning, the exhaust heat can be minimized. If the outdoor heat exchanger 103 is an air heat exchanger, for example, by controlling the compressor 21 for hot-water supply so as to reduce the air amount of the fan, the exhaust heat can be minimized.

REFERENCE SIGNS LIST 1 refrigerating cycle for air conditioning, 1a refrigerating cycle for air conditioning, 2 refrigerating cycle for hot-water supply, 3 water circulation cycle for hot-water supply, 21 compressor for hot-water supply, 22 throttle means for hot-water supply, 23 low-pressure-side pressure detecting means for hot-water supply, 24 high-pressure-side pressure detecting means for hot-water supply, 25 control means for hot-water supply, 26 communicating means for hot-water supply, 27 calculating means for hot-water supply, 28 storage means for hot-water supply, 31 water circulation pump, 32 hot-water tank, 33 supplied hot-water temperature detecting means, 41 refrigerant-refrigerant heat exchanger, 51 heat medium-refrigerant heat exchanger 70 high-pressure-side pressure sensor, 71 low-pressure-side pressure sensor, 80 high-pressure-side temperature sensor, 81 low-pressure-side temperature sensor, 100 combined air-conditioning and hot-water supply system, 100a combined air-conditioning and hot-water supply system, 100b combined air-conditioning and hot-water supply system, 101 compressor for air conditioning, 102 four-way valve, 103 outdoor heat exchanger, 104 accumulator, 105a check valve, 105b check valve, 105c check valve, 105d check valve, 106 high-pressure-side connection pipeline, 107 low-pressure-side connection pipeline, 108 gas-liquid separator, 109 valve means, 110 four-way valve, 111 connection pipeline, 112 first throttle means for branch unit, 113 internal heat exchanger, 114 second throttle means for branch unit, 115 connection pipeline, 116 connection pipeline, 117 throttle means for air conditioning, 118 indoor heat exchanger, 119 throttle means for hot-water supply heat source, 120 control means for air conditioning, 121 communicating means for air conditioning, 122 calculating means for air conditioning, 123 storage means for air conditioning, 130 first connection pipeline, 131 second connection pipeline, 133 connection pipeline, 134 connection pipeline, 135 connection pipeline, 136 connection pipeline, 137 connection pipeline, 138 connection pipeline, 13 connection pipeline, 140 connection pipeline, A heat source unit, B cooling indoor unit (heating indoor unit), C branch unit, C2 branch unit, D circuit for hot-water supply heat source.

The invention claimed is:

1. A combined air-conditioning and hot-water supply system comprising:

a heat source unit provided with a compressor for air conditioning, channel switching means, and an outdoor heat exchanger;

an indoor unit provided with an indoor heat exchanger and throttle means for air conditioning;

a circuit for a hot-water supply heat source provided with a refrigerant-refrigerant heat exchanger and throttle means for the hot-water supply heat source;

a branch unit that distributes a circulating refrigerant to said indoor unit and said circuit for the hot-water supply heat source;

a refrigerating cycle for air conditioning in which said indoor unit and said circuit for the hot-water supply heat source are connected in parallel and connected to said heat source unit via said branch unit; and a refrigerating cycle for hot-water supply in which a compressor for hot-water supply, a heat medium-refrigerant heat exchanger, throttle means for hot-water supply, and said refrigerant-refrigerant heat exchanger are connected in series, wherein said refrigerating cycle for air conditioning and said refrigerating cycle for hot-water supply are connected so that a refrigerant for air conditioning and a refrigerant for hot-water supply exchange heat in said refrigerant-refrigerant heat exchanger, said heat source unit and said branch unit are connected via a high-pressure-side connection pipeline having a first check valve that allows communication of a refrigerant for air conditioning only in one direction and a low-pressure-side connection pipeline having a second check valve that allows communication of a refrigerant for air conditioning only in one direction, a portion on an upstream side from the first check valve of said high-pressure-side connection pipeline and a portion on an upstream side from the second check valve of said low-pressure-side connection pipeline are connected via a first connection pipeline having a third check valve that allows communication of a refrigerant for air conditioning only in a direction from said low-pressure-side connection pipeline to said high-pressure-side connection pipeline, and a portion on a downstream side from the first check valve of said high-pressure-side connection pipeline and a portion on a downstream side from the second check valve of said low-pressure-side connection pipeline are connected via a second connection pipeline having a fourth check valve that allows communication of a refrigerant for air conditioning only in a direction from said low-pressure-side connection pipeline to said high-pressure-side connection pipeline.

2. The combined air-conditioning and hot-water supply system of claim 1, wherein said branch unit is provided with flow-rate adjusting throttle means that adjusts a flow rate of the refrigerant flowing through said circuit for the hot-water supply heat source;

at least one of a pressure sensor, provided to an upstream pipe of said flow-rate adjusting throttle means, that detects a pressure on the high-pressure-side of said circuit for the hot-water supply heat source and a temperature sensor, provided to an upstream pipe of said flow-rate adjusting throttle means, that detects a saturation temperature; and at least one of a pressure sensor, provided to an downstream pipe of said flow-rate adjusting throttle means, that detects a pressure on the low-pressure-side of said circuit for the hot-water supply heat source and a temperature sensor, provided to an downstream pipe of said flow-rate adjusting throttle means, that detects a saturation temperature.

3. The combined air-conditioning and hot-water supply system of claim 2, wherein said flow-rate adjusting throttle means adjusts a refrigerant flow rate so that at least one of a pressure difference and a saturation temperature difference between the high-pressure-side and the low-pressure-side of said circuit for the hot-water supply heat source lies within a predetermined range.

4. The combined air-conditioning and hot-water supply system of claim 1, wherein said branch unit is provided with an internal heat exchanger that increases a sub-cooling degree of the refrigerant to be distributed to said indoor unit and said sub-cooling degree is set at a positive value.

5. The combined air-conditioning and hot-water supply system of claim 1, wherein said branch unit is provided with channel switching means capable of switching a channel of the refrigerant flowing to said indoor unit and a channel of the refrigerant flowing to said circuit for the hot-water supply heat source; and valve means disposed in a channel that merges the refrigerants having passed through said indoor unit and said circuit for hot-water supply heat source.

6. The combined air-conditioning and hot-water supply system of claim 5, wherein said channel switching means disposed in said branch unit is constituted by a four-way valve in which one outlet port is closed.

7. The combined air-conditioning and hot-water supply system of claim 1, further comprising:

a hot-water supply controller having a communicating device for communicating information through wires or wirelessly for controlling an operation of the refrigerating cycle for hot-water supply; and an air conditioning controller having a communicating device for communicating information through wires or wirelessly for controlling an operation of the refrigerating cycle for air conditioning, wherein said hot-water supply controller communicating device and said air conditioning controller communicating device communicate with each other for coordinating the operation of said refrigerating cycle for hot-water supply and the operation of said refrigerating cycle for air conditioning.

8. The combined air-conditioning and hot-water supply system of claim 7, wherein:

said hot-water supply controller receives at least one of detection information of a pressure on the high-pressure-side of said refrigerating cycle for hot-water supply and detection information of a condensation temperature; and at least one of detection information of a pressure on the low-pressure-side of said refrigerating cycle for hot-water supply and detection information of evaporation temperature, and said hot water supply controller and said air conditioning controller communicate said detection information with each other for coordinating the operation of said refrigerating cycle for air conditioning and the operation of said refrigerating cycle for hot-water supply.

9. The combined air-conditioning and hot-water supply system of claim 7, wherein said hot water supply controller calculates a compression ratio of said compressor for hot-water supply from the detection information of and controls said throttle means for hot-water supply so that the calculation result lies in a predetermined range.

10. The combined air-conditioning and hot-water supply system of claim 7, wherein said hot-water supply controller is provided with storage for hot-water supply that stores at least one of said detection information and a hot-water supply calculator that calculates the compression ratio of said compressor for hot-water supply on the basis of the information stored in said storage for hot-water supply and controls said throttle means for hot-water supply on the basis of the calculation result of said hot-water supply calculator.

11. The combined air-conditioning and hot-water supply system of claim 7, wherein said hot-water supply controller is configured to receive information of a temperature of a heat medium at an outlet side of said heat medium-refrigerant heat exchanger; and to control said compressor for hot-water supply on the basis of the information of a temperature so that the temperature of the heat medium on the outlet side of said heat medium-refrigerant heat exchanger becomes close to a predetermined target value.

12. The combined air-conditioning and hot-water supply system of claim 7, wherein said hot-water supply controller estimates a temperature of a heat medium on the outlet side of said heat medium-refrigerant heat exchanger on the basis of at least one or more values including a pressure on the high-pressure-side of said refrigerating cycle for hot-water supply, a condensation temperature, and a temperature at a position from the outlet of said compressor for hot-water supply to the inlet of said heat medium-refrigerant heat exchanger, and controls said compressor for hot-water supply so that this estimated value becomes close to a predetermined target value.

13. The combined air-conditioning and hot-water supply system of claim 7, wherein
on the basis of the temperature of the heat medium on the outlet side of said heat medium-refrigerant heat exchanger, the upper limit value of the frequency of said compressor for hot-water supply is changed.

14. The combined air-conditioning and hot-water supply system of claim 7, wherein
only when said indoor heat exchanger is operating, on the basis of the temperature of the heat medium on the outlet side of said heat medium-refrigerant heat exchanger, an upper limit value of a frequency of said compressor for hot-water supply is changed.

15. The combined air-conditioning and hot-water supply system of claim 7, wherein
said compressor for hot-water supply is controlled so that a heat exchange amount in said outdoor heat exchanger lies in a predetermined range.

16. The combined air-conditioning and hot-water supply system of claim 1, further comprising:
a water circulation cycle for hot-water supply in which a water circulation pump, said heat medium-refrigerant heat exchanger, and a hot-water storage tank are connected in series and water is circulated as the heat medium, wherein
said refrigerant for hot-water supply and said water exchange heat in said heat medium-refrigerant heat exchanger so as to heat said water.

17. The combined air-conditioning and hot-water supply system of claim 1, wherein
a refrigerant having a critical temperature at 60° C. or more is employed for said refrigerant for hot-water supply.

* * * * *